(12) United States Patent
Fitzgerald et al.

(10) Patent No.: US 6,730,847 B1
(45) Date of Patent: May 4, 2004

(54) ELECTRICAL CONNECTION PROTECTOR KIT AND METHOD FOR USING THE SAME

(75) Inventors: Frank J. Fitzgerald, Cary, NC (US); Paul Raymond Carey, Raleigh, NC (US); Rudolf Robert Bukovnik, Chapel Hill, NC (US); Jeffery Craig Judd, Wake Forest, NC (US); Harry George Yaworski, Apex, NC (US); Kenton Archibald Blue, Holly Springs, NC (US); Jimmy E. Marks, Dunn, NC (US); Sherif I. Kamel, Apex, NC (US); George W. Pullium, III, Garner, NC (US)

(73) Assignee: Tyco Electronics Corporation, Middletown, PA (US)

( * ) Notice: Subject to any disclaimer, the term of this patent is extended or adjusted under 35 U.S.C. 154(b) by 440 days.

(21) Appl. No.: 09/660,062

(22) Filed: Sep. 12, 2000

Related U.S. Application Data

(63) Continuation-in-part of application No. 09/539,541, filed on Mar. 31, 2000, now abandoned.

(51) Int. Cl.[7] ............................................. H02G 15/04
(52) U.S. Cl. ..................... 174/77 R; 174/74 R; 174/76; 174/87; 29/855
(58) Field of Search ................................. 174/49, 74 R, 174/76, 77 R, 82, 84 S, 87, 138 F; 29/855; 439/521, 930

(56) References Cited

U.S. PATENT DOCUMENTS

| | | | |
|---|---|---|---|
| 2,296,227 A | | 9/1942 | Varga ........................... 174/87 |
| 2,792,444 A | | 5/1957 | Bergan ......................... 174/87 |
| 3,523,607 A | * | 8/1970 | Gillemot et al. ............... 174/76 |
| 3,839,595 A | * | 10/1974 | Yonkers ....................... 174/87 |
| 4,438,995 A | * | 3/1984 | Fisher et al. ................. 439/147 |

(List continued on next page.)

OTHER PUBLICATIONS

*Splice Insulators*, T&B, pp. M195 and M196, Jan. 21, 1985.
*Motor Lead Connections (5300 Series)*, 3M, pp. 287–290, date unknown (admitted prior art).
*Motor Stub Splice Insulator*, T&B, pp. D124, D125 and D127, date unknown (admitted prior art).
[*Untranslated Japanese language title*] *PST*, 3M, date unknown (admitted prior art).
*Motor Lead Splicing*, 3M Electrical Products Division, p. 72, date unknown (admitted prior art).
*Aerosols & Coatings*, 3M Electrical Products Division, p. 39, date unknown (admitted prior art).
*Termination, Splicing and Marking*, Wesco, pp. 5–10, 1993.
International Search Report for PCT/US01/10314 dated Sep. 25, 2001.

*Primary Examiner*—Anthony Dinkins
*Assistant Examiner*—Adolfo Nino
(74) *Attorney, Agent, or Firm*—Myers Bigel Sibley & Sajovec

(57) ABSTRACT

A connection protector kit for use with an electrical stub connection includes a flexible cap having first and second opposed ends and an interior wall defining a cavity. The first end is closed and an opening is formed in the second end and communicates with the cavity. A gel is disposed in the cavity. The cavity and the gel are adapted to receive the stub connection. Retaining means may be provided to retain the cap on the connection.

35 Claims, 24 Drawing Sheets

U.S. PATENT DOCUMENTS

| | | | |
|---|---|---|---|
| 4,721,832 A | 1/1988 | Toy | 174/87 |
| 4,880,676 A | 11/1989 | Puigcerver et al. | 428/35.7 |
| 4,888,070 A | 12/1989 | Clark et al. | 156/48 |
| 5,023,401 A * | 6/1991 | Clifton | 174/87 |
| 5,099,088 A | 3/1992 | Usami et al. | 174/76 |
| 5,140,746 A * | 8/1992 | Debbaut | 29/855 |
| 5,561,269 A | 10/1996 | Robertson et al. | 174/92 |
| 5,641,943 A * | 6/1997 | Sawamura | 174/74 A |
| 5,821,460 A * | 10/1998 | Marmy | 174/74 A |
| 5,824,954 A | 10/1998 | Biche et al. | 174/74 A |
| 5,828,005 A | 10/1998 | Huynh-Ba et al. | 174/92 |
| 5,895,890 A * | 4/1999 | Uchiyama et al. | 174/77 R |
| 5,922,992 A * | 7/1999 | Kinney et al. | 174/74 A |
| 5,962,811 A | 10/1999 | Rodrigues et al. | 174/76 |
| 6,025,559 A * | 2/2000 | Simmons | 174/87 |
| 6,075,209 A * | 6/2000 | Luzzi | 174/73.1 |
| 6,156,976 A * | 12/2000 | Kawamura et al. | 174/87 |
| RE37,340 E * | 8/2001 | King, Jr. | 174/87 |

* cited by examiner

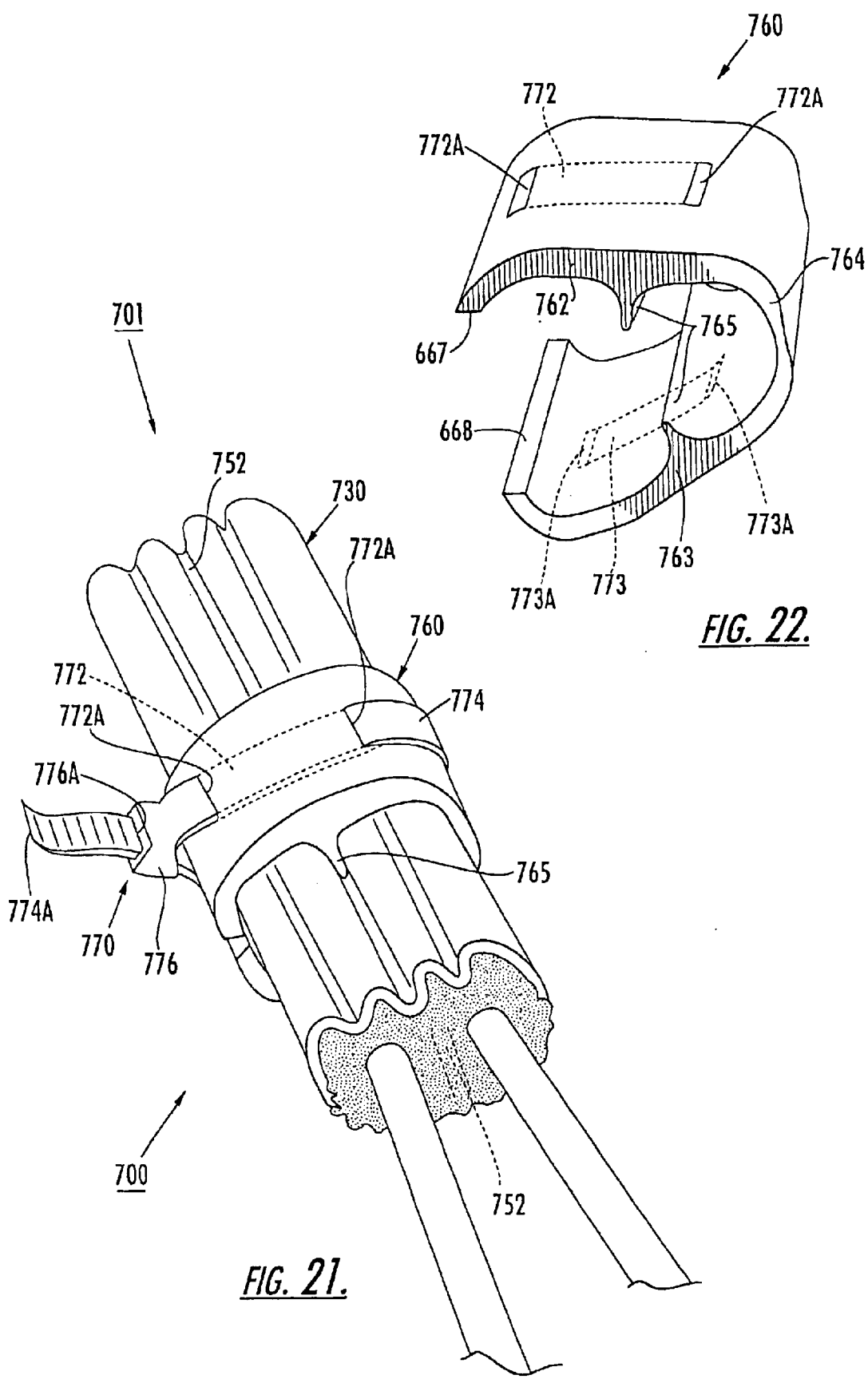

ELECTRICAL CONNECTION PROTECTOR KIT AND METHOD FOR USING THE SAME

RELATED APPLICATIONS

This is a continuation-in-part application of U.S. patent application Ser. No. 09/539,541, filed Mar. 31, 2000, now abandoned, the disclosure of which is incorporated herein by reference in its entirety.

FIELD OF THE INVENTION

The present invention relates to electrical connectors and, more particularly, to means for protecting electrical connections.

BACKGROUND OF THE INVENTION

"V"-type electrical connections or splices (also referred to as "stub" or "pigtail"-type connections) are often employed for motor connections. Such electrical connections may be exposed to dust, moisture and/or other corrosives. The electrical connections may also be subjected to mechanical impacts and/or vibration. It is, therefore, desirable to protect the connection from the surrounding environment.

One method of protecting an electrical motor connection includes applying a gummy adhesive tape around the connection. Another method includes placing a plastic cap over the connection and securing the cap in place by wrapping an adhesive tape around the cap and connection cables. Yet another method includes placing a plastic cap over the connection and securing the cap in place by inserting a pin through the cap (which may be provided with preformed holes) and between the cables. In each of the latter two methods, a relatively thin layer of grease may be used to facilitate pushing the cap over the connection. It is also known to apply mastic to a connection and wrap or heat shrink a cover over the connection and mastic.

While the foregoing methods provide some protection for V-type electrical connections, improved and more convenient protection is needed.

SUMMARY OF THE INVENTION

According to embodiments of the present invention, a connection protector kit for use with an electrical stub connection includes a flexible cap having first and second opposed ends and an interior wall defining a cavity. The first end is closed and an opening is formed in the second end and in communication with the cavity. A gel is disposed in the cavity. The cavity and the gel are adapted to receive the stub connection.

The kit may include means for retaining the cap on the connection. More particularly, the retaining means may be operative to maintain the cap in a compressed position. The cap may include a plurality of expandable corrugations.

The means for retaining may include a pin and a pair of opposed holes may be formed in the cap and adapted to receive the pin therethrough. The cap may be formed of a frangible thermoplastic elastomer. The pin may be connected to the cap by an integrally molded bridge member.

The means for retaining may include a clamp. Preferably, the clamp includes at least one inwardly extending locating projection. Preferably, the cap includes an inwardly extending channel adapted to receive the inwardly extending locating projection.

Preferably, the cap is formed of a material having a flexural modulus of between about 5,000 and 100,000 psi and a durometer of between about 40 Shore A and 90 Shore D. Preferably, the gel has a Voland hardness of between about 5 and 30 grams force, an elongation of at least 100%, a stress relaxation of no more than 50%, and a tack of greater than about 6 grams.

According to further embodiments of the present invention, a protected electrical connection assembly includes a flexible cap defining an opening and having an interior wall defining a cavity. The cavity communicates with the opening. A stub connection of the assembly includes a pair of elongated, electrically conductive elements joined at respective terminal ends thereof. The conductive elements define a crotch therebetween and extend through the opening. The terminal ends, and at least a portion of each of the conductive elements, are disposed in the cavity of the cap. A gel is disposed in the cavity and is interposed between the stub connection and the interior wall of the cap. Retaining means are operative to retain the cap on the connection.

Preferably, the gel is elongated and elastically deformed and applies an outward force against the connection and the interior wall. Preferably, at least a portion of the gel is elongated at least 50%. Preferably, the cap is compressed. The cap may be maintained in compression by the retaining means.

According to further embodiments of the present invention, a connection protector kit for use with an electrical stub connection includes a flexible cap having first and second opposed ends and an interior wall defining a cavity. The first end is closed and an opening is formed in the second end and in communication with the cavity. A clamp is provided to retain the cap on the connection. The cavity is adapted to receive the stub connection.

According to further embodiments of the present invention, a method for protecting an electrical stub connection includes placing a cap and a gel over the stub connection such that the stub connection is received in a cavity of the cap and the gel is interposed between the stub connection and an interior wall of the cap. The gel is deformed and elongated about the stub connection. The gel is maintained in the elongated state such that the gel exerts an outward force on the stub connection and the interior wall of the cap.

The step of deforming and elongating the gel may include placing the gel in the cavity and thereafter inserting the stub connection into the gel such that the gel is displaced by the stub connection and thereby elongated. The step of deforming and elongating the gel may include placing the gel in the cavity and thereafter compressing the cap such that the gel is displaced and thereby elongated. Preferably, the step of deforming and elongating the gel includes elongating at least a portion of the gel by at least 50%.

The method may include inserting a pin through the cap and a crotch of the stub connection. The method may include securing a clamp about the cap. The cap may be expanded to accommodate the stub connection. More particularly, the cap may be expanded by expanding corrugations in the cap.

According to embodiments of the present invention, a method for protecting an electrical stub connection includes providing a cap having a cavity and a gel disposed in the cavity. The stub connection is inserted into the cavity and the gel such that the stub connection displaces and thereby deforms and elongates the gel. The cap is compressed to further displace and thereby deform and elongate the gel. A pin is inserted through the cap and a crotch of the stub connection to retain the cap on the stub connection and to maintain the gel in the elongated state such that the gel exerts an outward force on the stub connection and the interior wall of the cap.

According to method embodiments of the present invention, a method for protecting an electrical stub connection includes providing a cap having a cavity and a gel disposed in the cavity; inserting the stub connection into the cavity and the gel such that the stub connection displaces and thereby deforms and elongates the gel; compressing the cap to further displace and thereby deform and elongate the gel; and securing a clamp about the cap to retain the cap on the stub connection and to maintain the gel in the elongated state such that the gel exerts and outward force on each of the stub connection and the interior wall of the cap. Preferably, the step of securing a clamp includes inserting a locating projection of the clamp into a crotch of the stub connection.

Objects of the present invention will be appreciated by those of ordinary skill in the art from a reading of the Figures and the detailed description of the preferred embodiments which follow, such description being merely illustrative of the present invention.

BRIEF DESCRIPTION OF THE DRAWINGS

FIG. 21 is a perspective view of a protected electrical connection assembly according to further embodiments of the present invention;

FIG. 22 is a perspective view of a clamp forming a part of the connection assembly of FIG. 21;

DETAILED DESCRIPTION OF THE PREFERRED EMBODIMENTS

Figure 1:
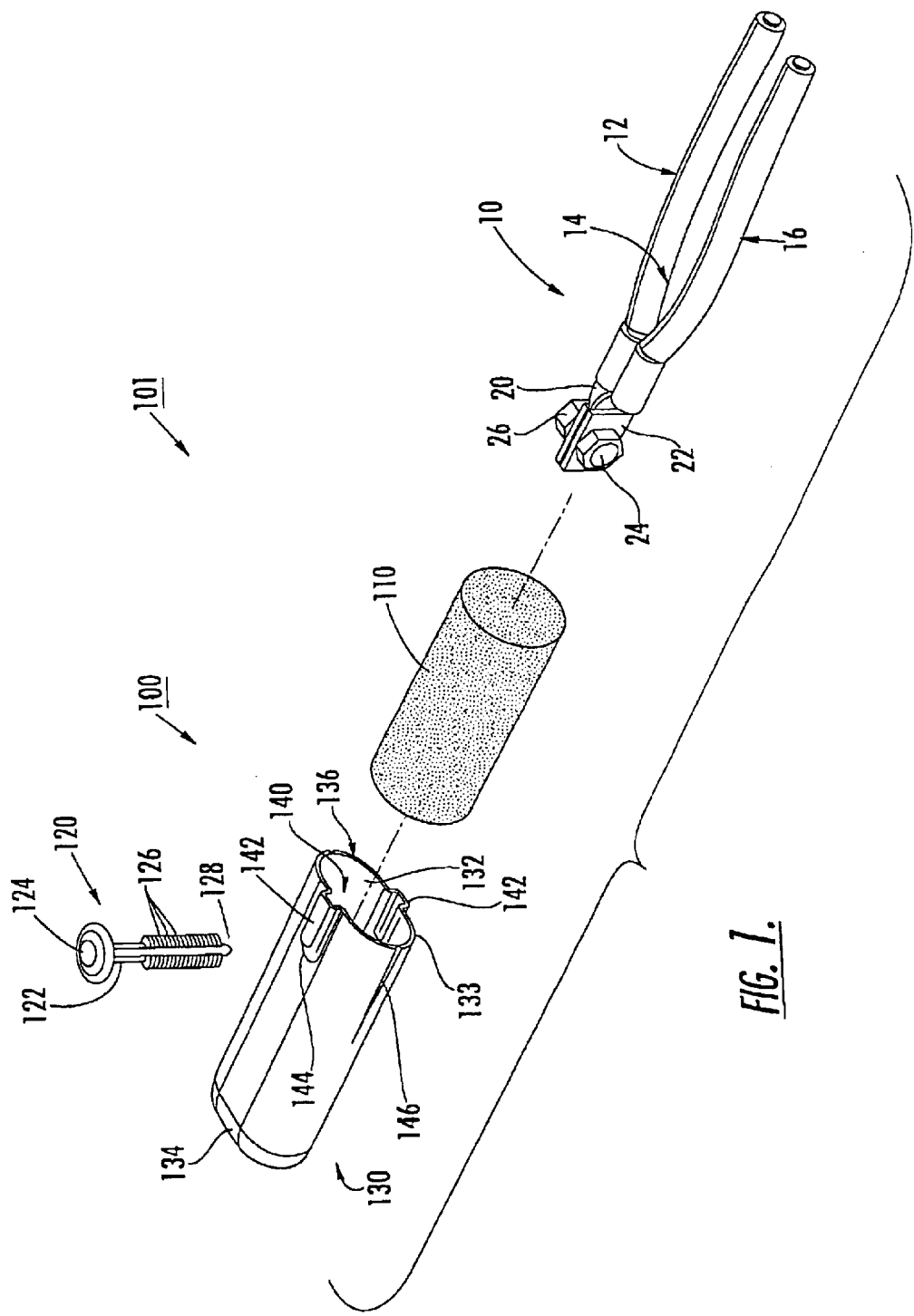
FIG. 1 is an exploded, perspective view of a protected electrical connection assembly according to embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Figure 2:
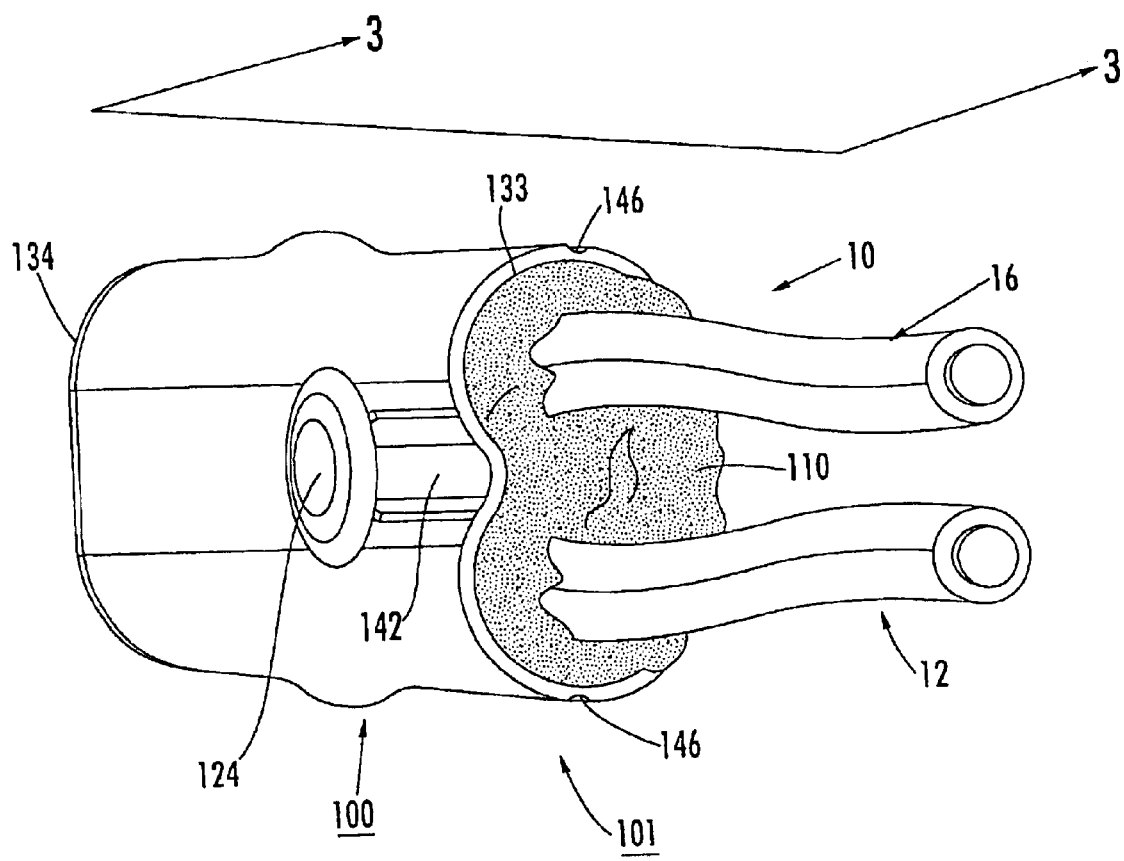
FIG. 2 is a perspective view of the connection assembly of FIG. 1.
Figure 3:
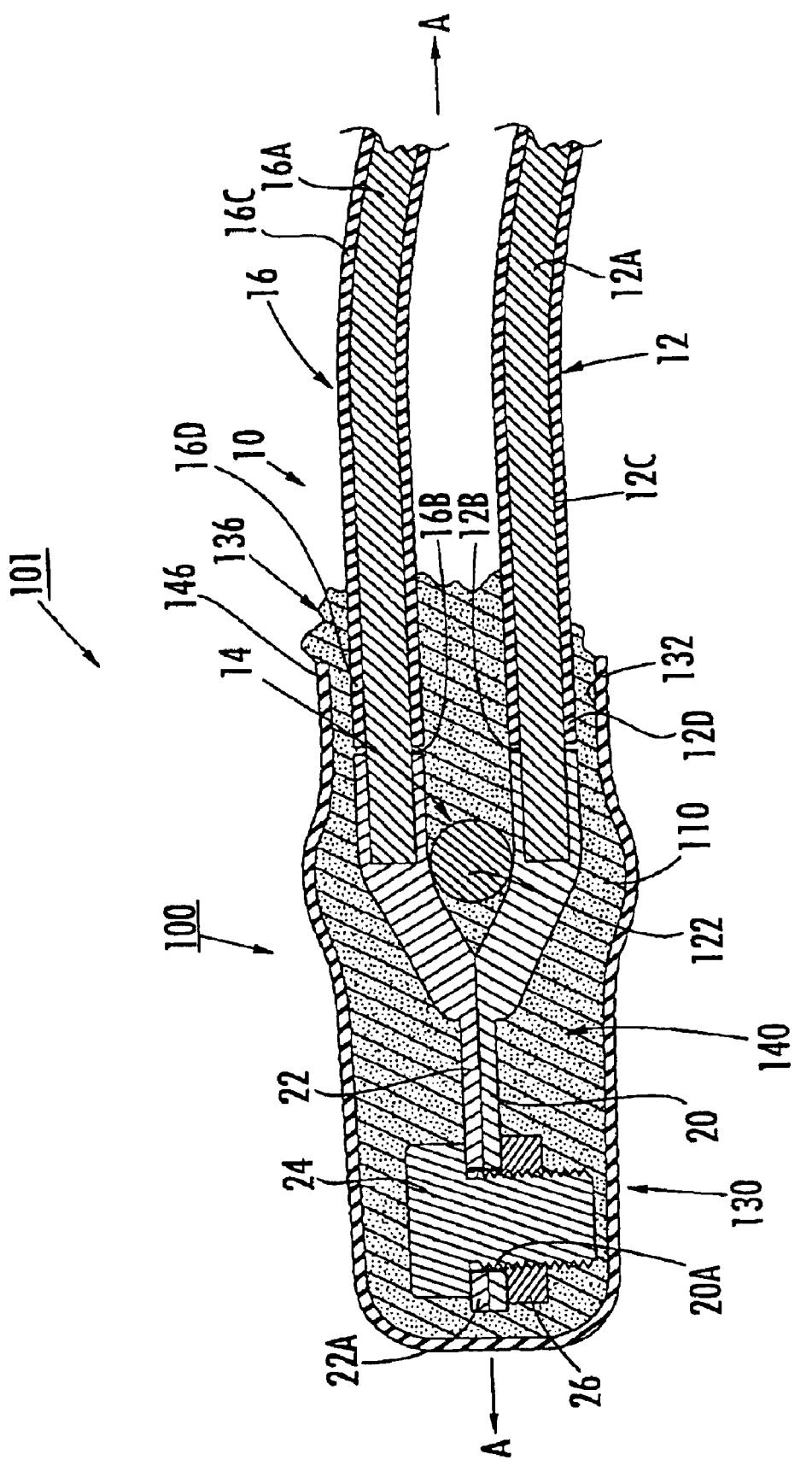
FIG. 3 is a cross-sectional view of the connection assembly of FIG. 1 taken along the line 3—3 of FIG. 2.
Figure 4:
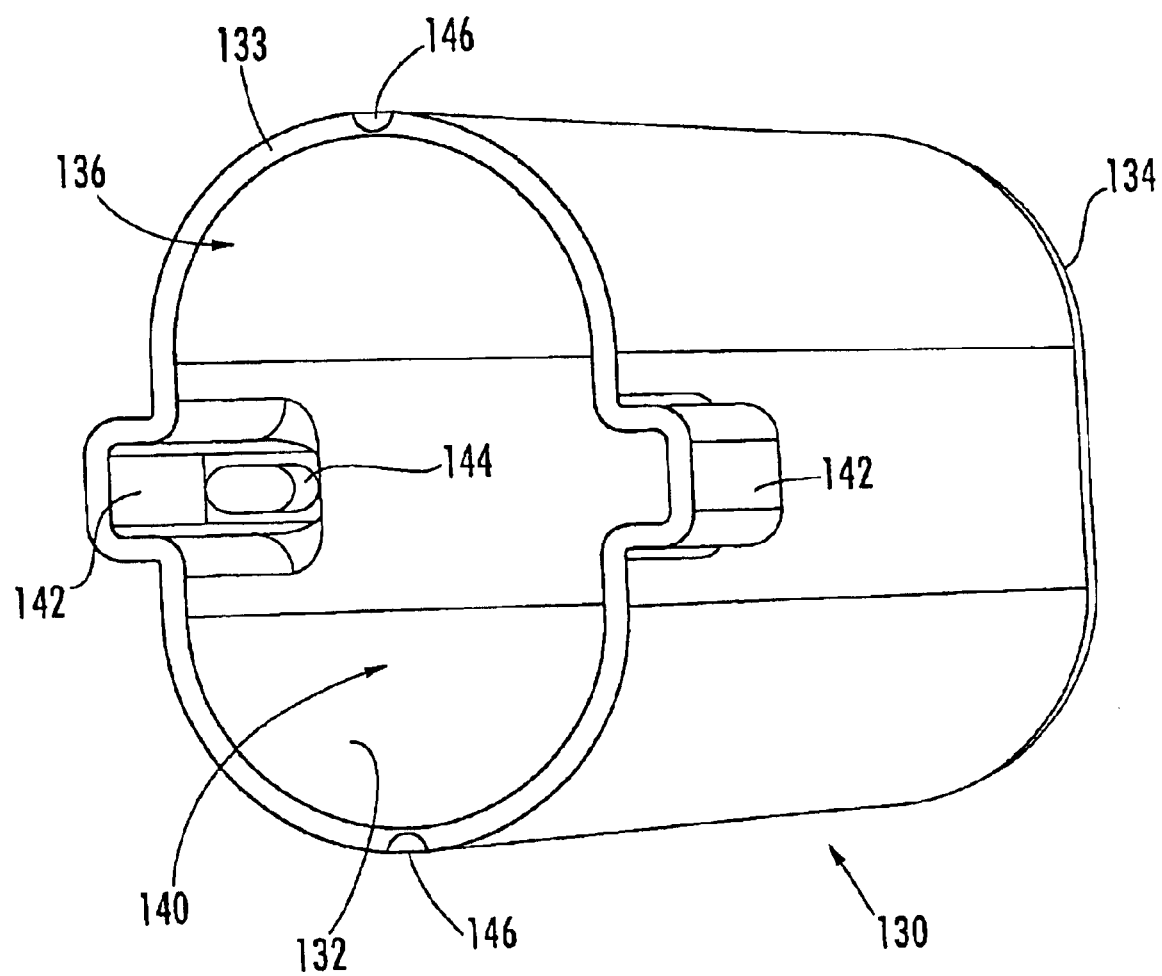
FIG. 4 is a rear perspective view of a cap forming a part of the connection assembly of FIG. 1.
Figure 5:
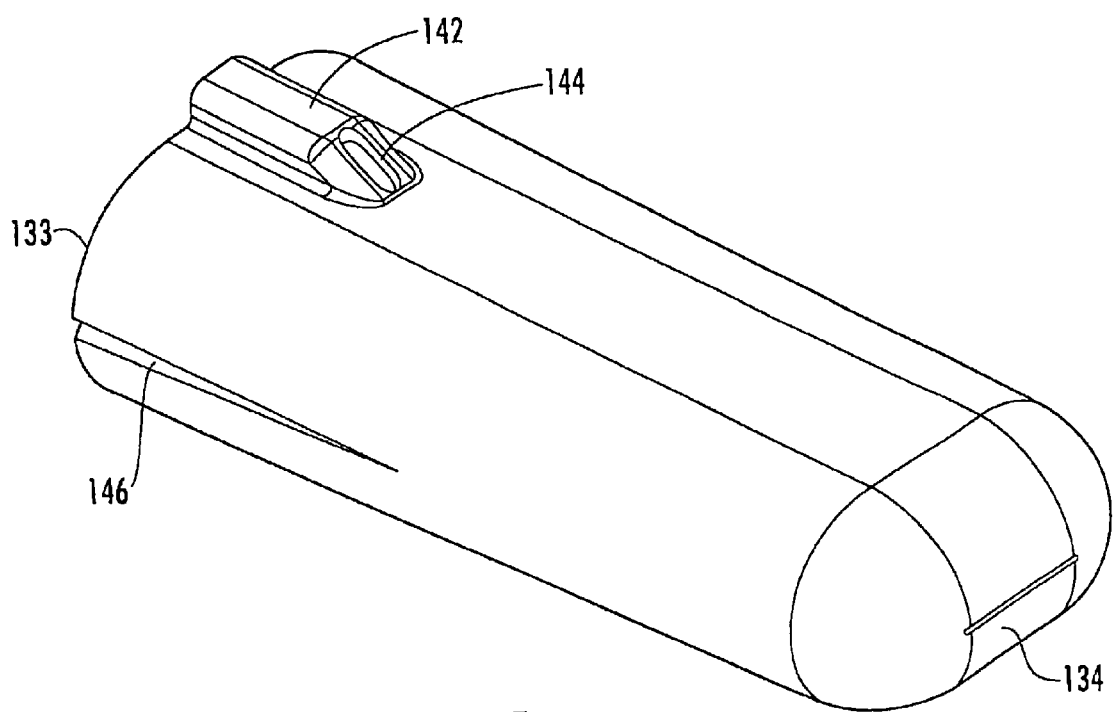
FIG. 5 is a front perspective view of the cap of FIG. 4.

With reference to FIGS. 1–3, an electrical connection kit according to embodiments of the present invention is shown therein and generally designated 100. The kit 100 includes a mass of gel 110, a cap 130 and a pin 120. The kit 100 may be mounted on a V-shaped stub connection 10 to provide a protected electrical connection assembly 101 (see FIGS. 2 and 3). As will be appreciated from the description that follows, in various embodiments the kit 100 may be quickly installed and cold-applied (i.e., installed without requiring heating). The kit 100 may provide a reliable and consistent seal to protect the connection 10 from moisture, dirt, dust, corrosives and other harmful environmental substances. The kit 100 may provide such protection even when the connection assembly 101 is submerged in water or other fluid. Moreover, the kit 100 may serve to dampen vibration to reduce or eliminate any tendency for such vibration to loosen the connection 10. The kit 100 may also electrically and thermally insulate the connection 10 and provide fire retardance.

Turning to the kit 100 in more detail and with reference to FIGS. 1–5, the cap 130 is preferably formed of a molded polymeric material. More preferably, the cap 130 is formed of an elastomer, and most preferably of a thermoplastic elastomer. Suitable materials include SANTOPRENE, a polypropylene/rubberblend, neoprene, silicone or EPDM. However, polyurethane is preferred. Preferably, the cap 130 is formed of a flame retardant material. For example, the polymeric material of the cap 130 may include a suitable additive to make the cap 130 flame retardant. Preferably, the cap material has a durometer of between about 40 Shore A and 90 Shore D, more preferably of between about 70 Shore A and 60 Shore D, and, most preferably, of between about 30 and 50 Shore D. Preferably, the cap has a flexural modulus of between about 5,000 and 100,000 psi, and more preferably of between about 20,000 and 30,000 psi.

For the purposes of discussion, the cap 130 has an axis A—A (see FIG. 3). The cap 130 has an interior surface 132, an open end 133 and an opposing closed end 134. An opening 136 defined in the open end 132 communicates with a cavity 140 defined within the cap 130 by the interior surface 132. Opposed projections 142 extend radially outwardly from the cap and define longitudinally extending interior channels therein. Holes 144 are pre-formed in each of the projections 142. Alternatively, the holes may be punched in the cap after the cap is molded. The projections 142 may be omitted and preferably are omitted where the holes are punched after molding. The holes 144 define a transverse axis extending through each of the holes 144. Generally V-shaped, longitudinally extending grooves 146 are formed in the outer surface of the cap 130 and communicate with the open end edge of the cap 130. Preferably, and as illustrated, the cap is free of openings other than the opening 136 and the holes 144.

The pin 120 is preferably formed of a rigid engineering plastic such as nylon or polypropylene. Preferably, the pin 120 is molded. The pin 120 includes a shaft 122 having a flat head 124 on one end and a tapered head 128 on an opposing end. A series of flexible, opposed barbs 126 extend radially outwardly from the shaft 122 between the heads 124, 128. The heads 124, 128 are sized relative to the holes 144 such that the head 128 may be forced through each hole 144, but thereafter the head 124 and the barbs 126 will each resist removal of the pin through either hole 144.

The term "gel" has been used in the prior art to cover a vast array of materials from greases to thixotropic compositions to fluid-extended polymeric systems. As used herein, "gel" refers to the category of materials which are solids extended by a fluid extender. The gel may be a substantially dilute system that exhibits no steady state flow. As discussed in Ferry, "Viscoelastic Properties of Polymers," 3$^{rd}$ ed. P. 529 (J. Wiley & Sons, New York 1980), a polymer gel may be a cross-linked solution whether linked by chemical bonds or crystallites or some other kind of junction. The absence of the steady state flow may be considered to be the key definition of the solid like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

Preferred gels for use in this invention are silicone (organopolysiloxane) gels, such as the fluid-extended systems taught in U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and U.S. Pat. No. 5,079,300 to Dubrow et al. (hereinafter "Dubrow '300"). These fluid-extended silicone gels may be created with nonreactive fluid extenders as in the previously recited patents or with an excess of a reactive liquid, e.g., a vinyl-rich silicone fluid, such that it acts like an extender, as exemplified by the Sylgard® 527 product commercially available from Dow-Corning of Midland, Mich. or as disclosed in U.S. Pat. No. 3,020,260 to Nelson. Because curing is involved in the preparation of these gels, they are sometimes referred to as thermosetting gels. An especially preferred gel is a silicone gel produced from a mixture of divinyl terminated polydimethylsiloxane, tetraks (dimethylsiloxy)silane, a platinum divinyltetramethyldisiloxane complex, commercially available from United Chemical Technologies, Inc. of Bristol, Pa., polydimethylsiloxane, and 1,3,5,7-tetravinyltetramethylcyclotetrasiloxane (reaction inhibitor for providing adequate pot life).

Other types of gels may be used, for example, polyurethane gels as taught in the aforementioned Debbaut '261 and U.S. Pat. No. 5,140,476 Debbaut (hereinafter "Debbaut '476") and gels based on styrene-ethylene butylenestyrene (SEBS) or styrene-ethylene propylene-styrene (SEPSS) extended with an extender oil of naphthenic or nonaromatic or low aramatic content hydrocarbon oil, as described in U.S. Pat. No. 4,369,284 to Chen; U.S. Pat. No. 4,716,183 to Gamarra et al.; and U.S. Pat. No. 4,942,270 to Gamarra. The SEBS and SEPS gels comprise glassy styrenic microphases interconnected by a fluid-extended elastomeric phase. The microphase-separated styrenic domains serve as the junction points in the systems. The SEBS and SEPS gels are examples of thermoplastic systems.

Another class of gels which may be considered are EPDM rubber based gels, as described in U.S. Pat. No. 5,177,143 to Chang et al. However, these gels tend to continue to cure over time and thus may become unacceptably hard with aging.

Yet another class of gels which may be suitable are based on anhydride-containing polymers, as disclosed in WO 96/23007. These gels reportedly have good thermal resistance.

The gel may include a variety of additives, including stabilizers and antioxidants such as hindered phenols (e.g., Irganox™ 1076, commercially available from Ciba-Geigy Corp. of Tarrytown, N.Y.), phosphites (e.g., Irgafos™ 168,, commercially available from Ciba-Geigy Corp. of Tarrytown, N.Y.), metal deactivators (e.g., Irganox™ D1024 from Ciba-Geigy Corp. of Tarrytown, N.Y.), and sulfides (e.g., Cyanox LTDP, commercially available from American Cyanamid Co. of Wayne, N.J.), light stabilizers (i.e. Cyasorb UV-531, commercially available from American Cyanamid Co. of Wayne, N.J.), and flame retardants such as halogenated paraffins (e.g., Bromoklor 50, commercially available from Ferro Corp. of Hammond, Ind.) and/or phosphorous containing organic compounds (e.g., Fyrol PCF and Phosflex 390, both commercially available from Akzo Nobel Chemicals Inc. of Dobbs Ferry, N.Y.) and acid scavengers (e.g., DHT-4A, commercially available from Kyowa Chemical Industry Co. Ltd through Mitsui & Co. of Cleveland, Ohio, and hydrotalcite). Other suitable additives include colorants, biocides, tackfiers and the like described in "Additives for Plastics, Edition 1" published by D.A.T.A., Inc. and The International Plastics Selector, Inc., San Diego, Calif.

The hardness, stress relaxation, and tack may be measured using a Texture Technologies Texture Analyzer TA-XT2 commercially available from Texture Technologies Corp. of Scarsdale, N.Y., or like machines, having a five kilogram load cell to measure force, a 5 gram trigger, and ¼ inch (6.35 mm) stainless steel ball probe as described in Dubrow '300, the disclosure of which is incorporated herein by reference in its entirety. For example, for measuring the hardness of a gel a 60 mL glass vial with about 20 grams of gel, or alternately a stack of nine 2 inch×2 inch×⅛" thick slabs of gel, is placed in the Texture Technologies Texture Analyzer and the probe is forced into the gel at the speed of 0.2 mm per sec to a penetration distance of 4.0 mm. The hardness of the gel is the force in grams, as recorded by a computer, required to force the probe at that speed to penetrate or deform the surface of the gel specified for 4.0 mm. Higher numbers signify harder gels. The data from the Texture Analyzer TA-XT2 may be analyzed on an IBM PC or like computer, running Microsystems Ltd, XT.RA Dimension Version 2.3 software.

The tack and stress relaxation are read from the stress curve generated when the XT.RA Dimension version 2.3 software automatically traces the force versus time curve experienced by the load cell when the penetration speed is 2.0 mm/second and the probe is forced into the gel a penetration distance of about 4.0 mm. The probe is held at 4.0 mm penetration for 1 minute and withdrawn at a speed of 2.00 mm/second. The stress relaxation is the ratio of the initial force ($F_i$) resisting the probe at the pre-set penetration depth minus the force resisting the probe ($F_f$) after 1 min divided by the initial force $F_i$, expressed as a percentage. That is, percent stress relaxation is equal to $$(F_i-F_f)/F_i \times 100\%$$

where $F_i$ and $F_f$ are in grams. In other words the stress relaxation is the ratio of the initial force minus the force after 1 minute over the initial force. It may be considered to be a measure of the ability of the gel to relax any induced compression placed on the gel. The tack may be considered to be the amount of force in grams resistance on the probe as it is pulled out of the gel when the probe is withdrawn at a speed of 2.0 mm/second from the preset penetration depth.

An alternative way to characterize the gels is by cone penetration parameters according to ASTM D-217 as proposed in Debbaut '261; Debbaut '207; Debbaut '746; and U.S. Pat. No. 5,357,057 to Debbaut et al., each of which is incorporated herein by reference in its entirety. Cone penetration ("CP") values may range from about 70 ($10^{-1}$ mm) to about 400 ($10^{-1}$ mm). Harder gels may generally have CP values from about 70 ($10^{-1}$ mm) to about 120 ($10^{-1}$ mm). Softer gels may generally have CP values from about 200 ($10^{-1}$ mm) to about 400 ($10^{-1}$ mm), with particularly preferred range of from about 250 ($10^{-1}$ mm) to about 375 ($10^{-1}$ mm). For a particular materials system, a relationship between CP and Voland gram hardness can be developed as proposed in U.S. Pat. No. 4,852,646 to Dittmer et al.

Preferably, the gel 110 has a Voland hardness, as measured by a texture analyzer, of between about 5 and 100 grams force, more preferably of between about 5 and 30 grams force, and, most preferably, of between about 10 and 20 grams force. Preferably, the gel 110 has an elongation, as measured by ASTM D-638, of at least 55%, more preferably of at least 100%, and most preferably of at least 1,000%. Preferably, the gel 110 has a stress relaxation of less than 80%, more preferably of less than 50%, and most preferably of less than 35%. The gel has a tack preferably greater than about 1 gram, more preferably greater than about 6 grams, and most preferably between about 10 and 50 grams. Suitable gel materials include POWERGEL sealant gel available from Tyco Electronics Energy Division of Fuqua-Varina, NC under the RAYCHEM brand.

The connection 10 is illustrative of a connection with which the kit 100 may be employed. However, the kit 100 may be used with stub-type connections of other types such as, for example, a crimped stub connection, a mechanical stub connection, or a twisted stub connection. As used herein, "stub connection" means any connection wherein two or more wires or cables are joined at or near their ends to form a generally V-shaped connection.

The connection 10 is illustrative of, for example, a conventional motor connection. The connection 10 as illustrated includes two cables 12, 16. The cables 12, 16 may be replaced with any suitable elongated, electrically conductive elements. Each cable 12, 16 has an elongated electrical conductor 12A, 16A and a surrounding insulator 12C, 16C (see FIG. 3). The cables 12, 16 have respective lugs or connectors 20, 22 secured to their terminal ends. A bolt 24 extends through holes 20A and 22A in the connectors 20, 22 and is secured in place by a cooperating nut 26. The cables 12, 16 define a generally V-shaped crotch 14 therebetween. There may be one or more additional cables secured with the ends of the cables 12, 16, and these additional cables may form further V-shaped crotches with the cable 12, the cable 16 and/or with one another.

With reference to FIGS. 1–3, the kit 100 may be installed on the connection 10 in the following manner. The gel 110 is placed in the cavity 140 of the cap 130. Preferably, the gel is placed fully in the rear of the cavity such that there are substantially no voids in the cavity 140 between the closed end 134 and the surface of the gel adjacent the open end 133. Preferably, the gel 110 is pre-installed (and cured in situ) in the cap 130 so that the user need not place the gel in the cap.

Thereafter, the connection 10 is pushed into the cavity 140 at least until the axis extending through the holes 144 extends through the crotch 14 of the connection 10. Preferably, the connection is pushed into the cavity 140 until it bottoms out in the cap's closed end 134. As the connection 10 is inserted, the connection 10 and the interior surface 132 of the cap 130 apply a compressive force to the gel 110. As a result, the gel 110 elongates and is generally deformed to substantially conform to the outer surfaces of the connection 10 and to the interior surface 132. The gel may further elongate such that a portion thereof is displaced toward the cap opening. Some shearing of the gel 110 may occur as well. A portion of the gel 110 may be displaced out of the cap 130. Preferably, at least some of the gel deformation is elastic.

Once the connection 10 is positioned in the cavity as described above, the pin 120 is inserted (tapered end 128 first) through the holes 144 and the crotch 14. The pin 120 is inserted such that one or more of the sets of barbs 126 pass through the far side hole 144. Preferably, the pin is inserted sufficiently far that the cap 130 is partially compressed or collapsed. The grooves 146 may facilitate preferential deformation of the cap 130. In this manner, the user may selectively reduce the volume of the cavity 140 and thereby place the gel 110 under further compressive force. Preferably, this additional compressive force further elongates and elastically deforms the gel 110. The restoring force in the gel 110 resulting from the elastic deformation causes the gel to operate as a spring exerting an outward force between the cap 130 and the connection 10. However, the pin 120 preferably abuts the crotch 14 of the connection 10 and may thereby prevent the gel 110 from relatively displacing the cap 130 and the connection 10. The pin 120 may also maintain the cap in compression as shown in FIG. 2.

With reference to FIG. 3, the volumes, shapes and sizes of the gel 110, the cap 130 and the connection 10 are preferably selected and the kit is preferably installed such that the substantial entirety of the exposed electrically conductive portions (i.e., the connectors 20, 22, the exposed portions of the bolt 24, the nut 26 and the uninsulated portions 12B, 16B of the cables 12, 16) of the connection 10 are substantially fully immersed in the gel 110. Preferably, at least the portions 12D, 16D of the cable insulations 12C, 16C immediately adjacent the exposed conductor portions 12B, 16B are substantially completely surrounded by the gel 110. Preferably, the insulator portions 12D, 16D each have a length of at least 0.100 inch. Preferably, when the kit 100 is installed, the gel 110 has a minimum elongation at the interface between the gel 110 and the exposed electrically conductive surfaces of the connection 10 of at least 50%.

Various properties of the gel 110 as described above may ensure that the gel 110 maintains a reliable and long lasting hermetic seal between the cap 130 and the connection 10. The elastic memory of and the retained or restoring force in the elongated, elastically deformed gel 110 generally cause the gel to bear against the mating surfaces of the connection 10 and the interior surface 132 of the cap 130. Also, the tack of the gel may provide adhesion between the gel and these surfaces. The gel, even though it is cold-applied, is generally able to flow about the connection 10 and the cap 130 to accommodate their irregular geometries.

Preferably, the gel 110 is a self-healing or self-amalgumating gel. This characteristic, combined with the aforementioned compressive force between the connection 10 and the cap 130, may allow the gel 110 to re-form into a continuous body if the gel 110 is sheared by the insertion of the connection 10 into the cap 130. The gel may also re-form if the connection 10 is withdrawn from the gel 110.

The kit 100 may provide a number of advantages over many prior art methods for protecting a stub-type electrical connection. The kit 100 may be effectively cold-applied. In its preferred supplied configuration, the kit 100 may be installed by simply inserting the connection 10 into the cap 130, holding the cap 130 in place, and then inserting the pin 120. Hence, the kit 100 may be quickly and consistently installed without requiring special tools, heat or inordinate strength or dexterity, and without mess. The elastic, displaceable gel 110 and the barbs 126 on the pin 120 allow a kit 100 including a cap 130 of a given size to effectively accommodate connections 10 of a range of different sizes and including more or fewer cables 12, 16.

The gel 110 may provide a reliable moisture barrier for the connection 10, even when the assembly 101 is submerged or subjected to extreme temperatures and temperature changes. Preferably, the cap 130 is made from an abrasion resistant material that resists being punctured by the abrasive forces between the motor box and the connection 10.

The gel 110 may also serve to reduce or prevent fire. The gel is typically a more efficient thermal conductor than air and, thereby, may conduct more heat from the connection. In this manner, the gel 110 may reduce the tendency for overheating of the connection 10 that might otherwise tend to deteriorate the cable insulation and cause thermal runaway and ensuing electrical arcing at the connection 10. Moreover, in its preferred form, the gel 110 is flame retardant.

Figure 6:
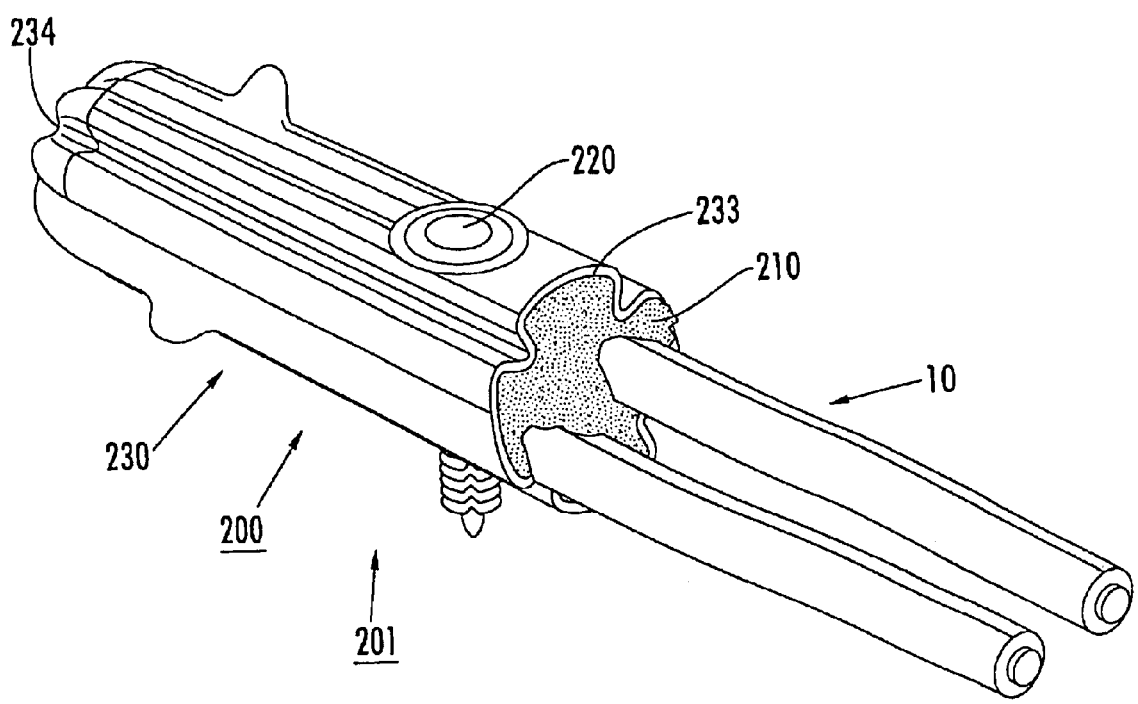
FIG. 6 is a perspective view of a protected electrical connection assembly according to further embodiments of the present invention.

With reference to FIG. 6, an electrical connection protector kit 200 according to further embodiments of the present invention and a protected electrical connection assembly 201 including the kit 200 mounted on the connection 10 are shown therein. The kit 200 generally corresponds to the kit 100 except that the cap 230 of the kit 200 is differently formed from the cap 120.

Figure 7:
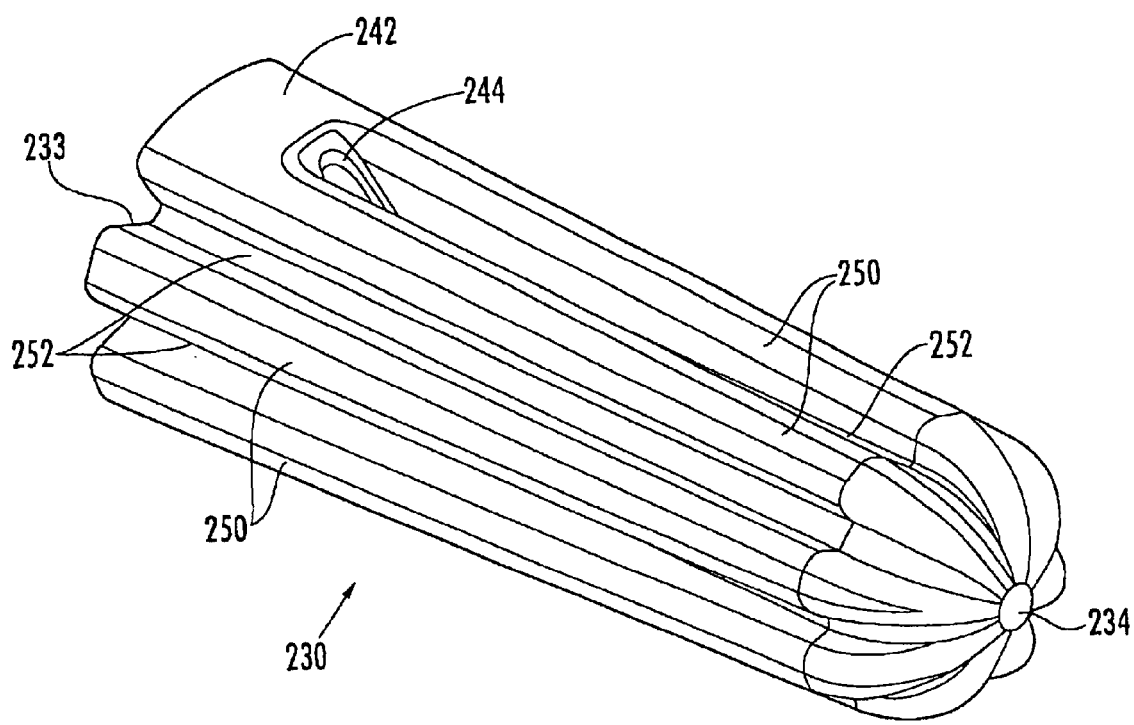
FIG. 7 is a front perspective view of a cap forming a part of the connection assembly of FIG. 6.
Figure 8:
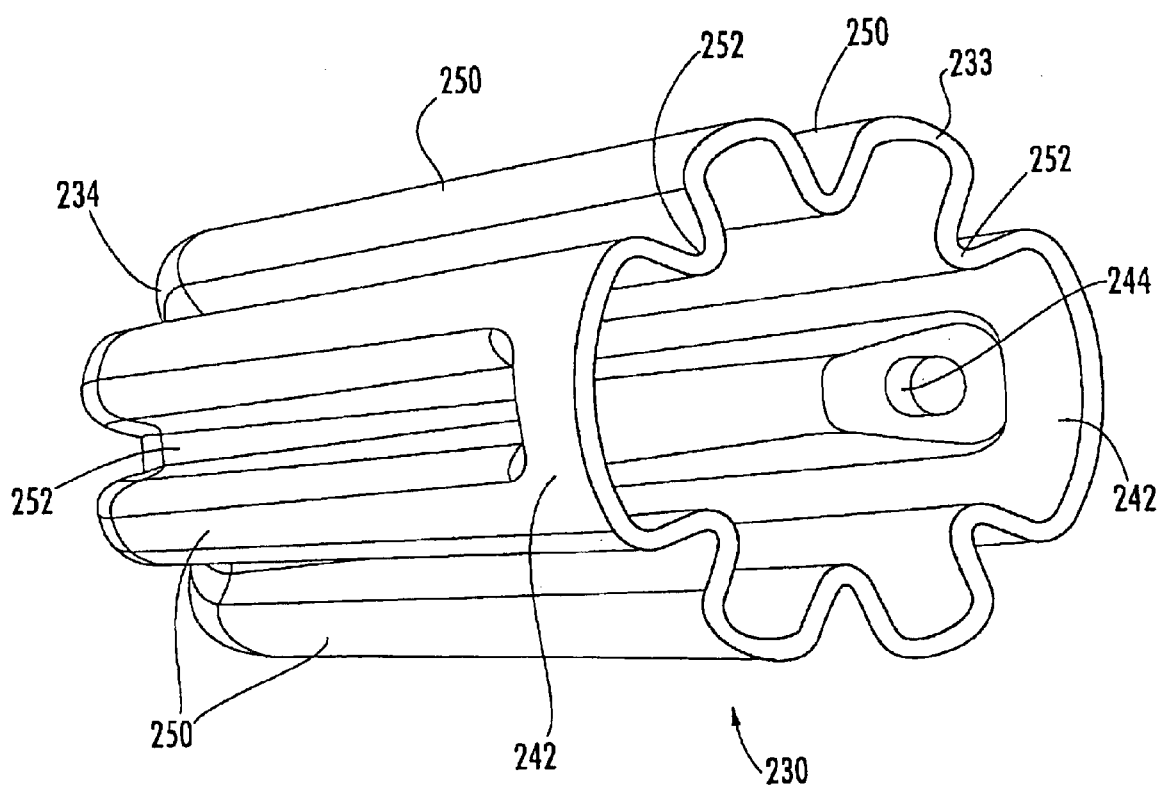
FIG. 8 is a rear perspective view of the cap of FIG. 7.

The cap 230 is preferably formed in the same manner and of the same materials as the cap 130 except as follows. As best seen in FIGS. 7 and 8, the cap 230 includes a plurality of radially outwardly extending corrugations 250 and a plurality of radially inwardly extending corrugations 252 alternating with the corrugations 250 to present a zig-zagged cross-section. Preferably, each of the corrugations 250, 252 extends longitudinally from the open end 233 to the closed end 234 as illustrated. Projections 242 and holes 244 are provided adjacent the open end 233.

The kit 200 may be used in a similar manner as the kit 100. The modulus of elasticity of the cap material, the configuration of the cap 230 and the stress relaxation of the gel 210 are preferably relatively selected such that, upon application of a force to the gel 210 (e.g., by inserting the connection 10) up to a prescribed force, substantially all of the force will be accommodated by elongation and elastic deformation of the gel 210. Upon application of additional force to the gel 210 (e.g., by further inserting the connection 10 and/or compressing the cap 230 with the pin 220), the cap 230 will also flex and, upon application of sufficient additional force, the cap material will stretch.

The kit 200 generally may provide the same advantages as described above with regard to the kit 100. Additionally, the kit 200 may accommodate connections 10 of a greater range of different sizes while also minimizing the size of the connection assembly 201. The corrugations 250, 252 may allow the cap 230 to expand as needed to accommodate larger connections 10 and larger numbers of cables 12, 16 so that the volume of the installed cap 230 is proportional to the size of the connection 10. In this manner, the space required for the assembly 201 may be minimized. This may provide a particular advantage where the connection 10 is to be housed in a motor connection box where space may be limited.

The gel 210 will typically have a substantially greater coefficient of thermal expansion than the material of the cap 230. In use, the connector assembly 201 may experience regular heat cycling as well as extreme temperature excursions. For a given rise in temperature, a portion of the gel's volumetric expansion will be expected to result in additional elongation. However, the gel 210 may also exert an outward force on the cap 230. The corrugations 250, 252 may flex to expand outwardly and thereby accommodate this force. The cap material may also stretch. If the temperature is subsequently lowered, the gel 210 will volumetrically contract. The flexural memory of the cap material will allow the corrugations, and thus the cap, to recover and reduce the interior volume of the cap. If the cap was also stretched by the earlier gel expansion, the elastic memory of the cap material may also allow the cap to recover. In this manner, the creation of gaps between the outer surface of the gel and the interior surface of the cap as a result of temperature fluctuations may be minimized or prevented.

Preferably, the material of the cap 230 has a durometer and a flexural modulus as described above with regard to the cap 130. Preferably, the corrugations 250, 252 are arranged and configured to allow for a maximum expansion of the outer diameter of the cap 230 of at least 10%, and preferably of between about 50% and 150%. It will be appreciated that corrugations of other shapes and relative configurations may be employed.

Figure 9:
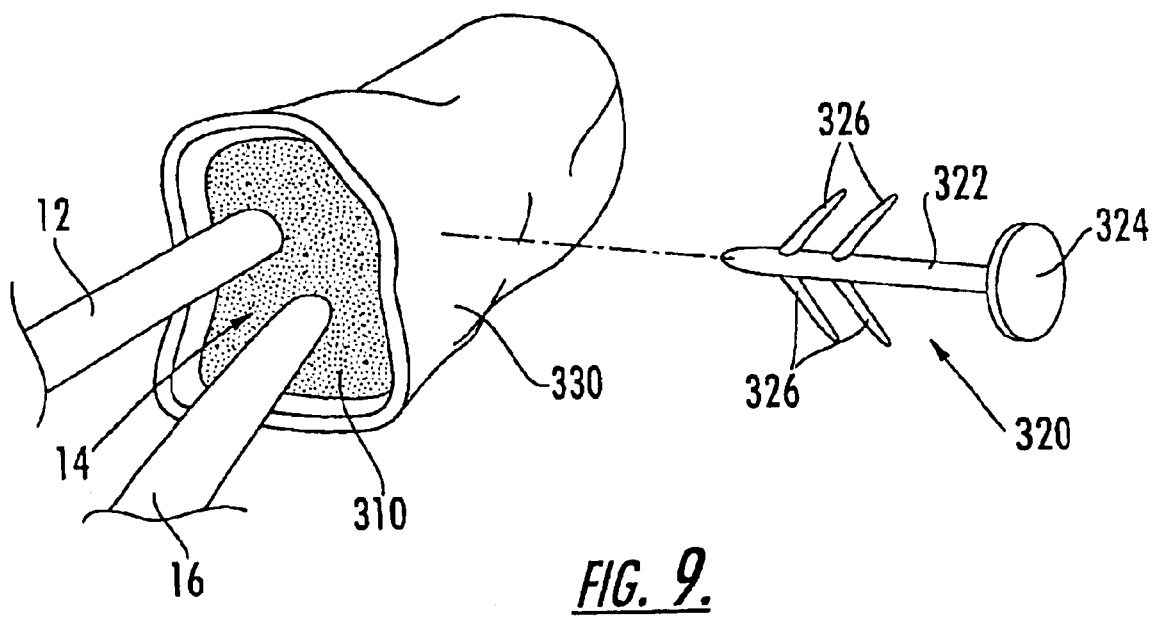
FIG. 9 is a perspective view of a protected electrical connection assembly according to further embodiments of the present invention.
Figure 10:
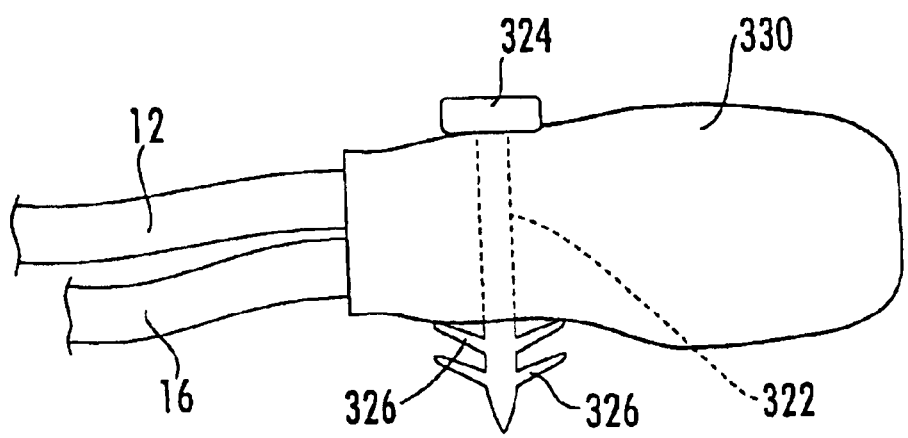
FIG. 10 is a side elevational view of the connection assembly of FIG. 9.

With reference to FIGS. 9 and 10, an electrical connection protector kit 300 according to further embodiments of the present invention and a protected electrical connection assembly 301 including the kit 300 mounted on the connection 10 are shown therein. The kit 300 corresponds to the kit 100 except that the cap 330 thereof is formed of a frangible material and no preformed holes corresponding to the holes 144 are provided. The frangible material is preferably a thermoplastic elastomer having a tensile strength of between about 1,000 and 3,000 psi.

The kit 300 may be installed in substantially the same manner as the kit 100, except as follows. After the connection 10 is inserted into the gel 310 and the cap 330, the user locates the crotch 14 of the connection 10. The user then presses the pin 320 through the frangible cap 330, through the crotch 14, and then through the opposite side of the cap 330. The pin 320 is retained in place, with the shaft 322 positioned in the connection crotch 14, by the head 324 and the barbs 326. In this manner, the cap 330 may be secured on the connection 10 and a compressive force may be applied to the gel 310 as discussed above with regard to the kit 100.

While the foregoing kits preferably employ pins 120, 220, 320 as shown, the caps thereof may also be retained and compressed using other suitable means. For example, the pins may be replaced by or supplemented with a tape wrap, a clamp ring, or a clip. Also, the caps 130, 230, 330 may be formed of a heat shrinkable thermoplastic elastomer and heated after the connection 10 has been inserted. In the embodiments using pins, a series of pairs of opposed holes may be provided along the length of the cap so that the pin may be inserted through a selected pair of holes at a preferred location, depending on the location of the connection crotch 14. The illustrated, barbed pins may be replaced with threaded pins (e.g., bolts or screws) and complementary threaded nuts.

As noted above, the gel 110, 210 is preferably cured in situ. With the cap oriented vertically with the open end up, the liquid, uncured gel may be dispensed into the cavity of the molded cap 130, 230 and thereafter cured. Preferably, thin skins of the elastomeric cap material cover the holes 144, 244 to prevent seepage of the uncured gel and also to minimize expulsion of the cured gel through the holes 144, 244 when the connection 10 is inserted during installation. Preferential tear or score lines may be provided in the skins.

Figure 11:
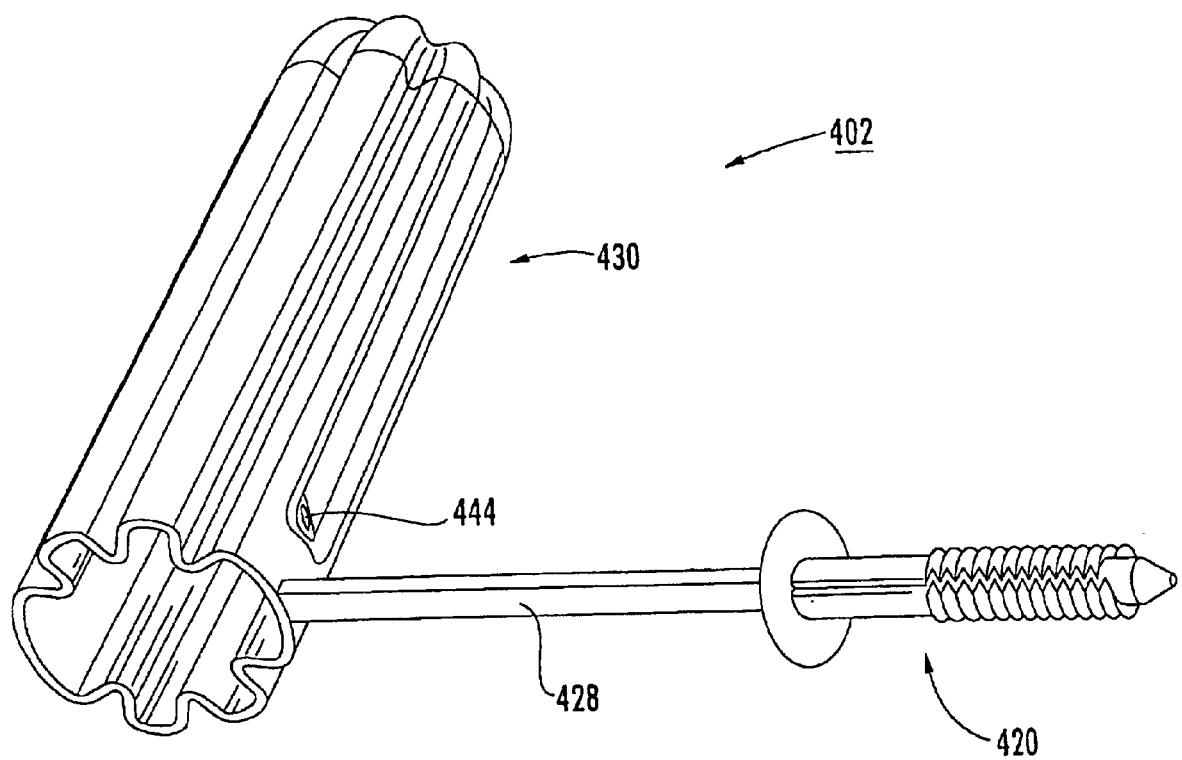
FIG. 11 is a perspective view of a cap/pin assembly according to further embodiments of the present invention.

With reference to FIG. 11, a cap/pin assembly 402 according to further embodiments is shown therein. The assembly 402 includes a cap 430 generally corresponding to the cap 130 and a pin 420 generally corresponding to the pin 120. A flexible bridge member 428 joins the pin 420 to the cap 430. Preferably, the cap 430, the pin 420 and the bridge member 428 are integrally molded and formed of the same material as described above with regard to the cap 130. The assembly 402 may be used in a connection protector kit otherwise corresponding to the kit 100 or the kit 200, for example. In use, the user may bend the bridge member 428 to insert the pin through the holes 444 of the cap 430. In this manner, the number of loose pieces in the kit are reduced.

With reference to FIGS. 12–17, an electrical connection protector kit 500 according to further embodiments of the present invention and a protected electrical connection assembly 501 including the kit 500 mounted on the connection 10 are shown therein. The kit 500 generally corresponds to the kit 200 except that the kit 500 is secured using a clamp 560 and no pin corresponding to the pin 220 is provided. The kit 500 includes a cap 530 having outwardly extending corrugations 550 and inwardly extending corrugations or channels 552. A gel 510 corresponding to the gel 110 is provided in the cap 530.

The clamp 560 is preferably molded or extruded from a flexible, stretch resistant polymeric material such as polypropylene. The clamp 560 includes first and second opposed walls or legs 562, 563 which are joined along a connecting portion 564. The widths W of the walls 562, 563 and the connecting portion 564 are selected to provide the desired amount of displacement of the gel 510 when the clamp is mounted and closed, as discussed in more detail below. The walls 562, 563 and the connecting portion 564 define a cavity 566. Opposed locating projections or ribs 565 are integrally formed with and extend inwardly from the inner surfaces of the walls 562, 563 into the cavity 566. Barbed latching structures 567,568 are formed on the free ends of the walls 562, 563. A closure projection or rib 567A extends outwardly from the wall 562. Each of the locating ribs 565 and closure rib 567A may be replaced with projections of other configurations; however, the laterally extending ribs as shown are preferred.

The nominal thickness D of the connecting portion 546 is preferably selected such that the walls 562, 563 may be pulled apart far enough to allow the clamp 560 to be wrapped about the cap 530, the gel 510 and the connection 10 but the connecting portion 564 will not stretch or break under a prescribed load corresponding to the anticipated load.

Figure 12:
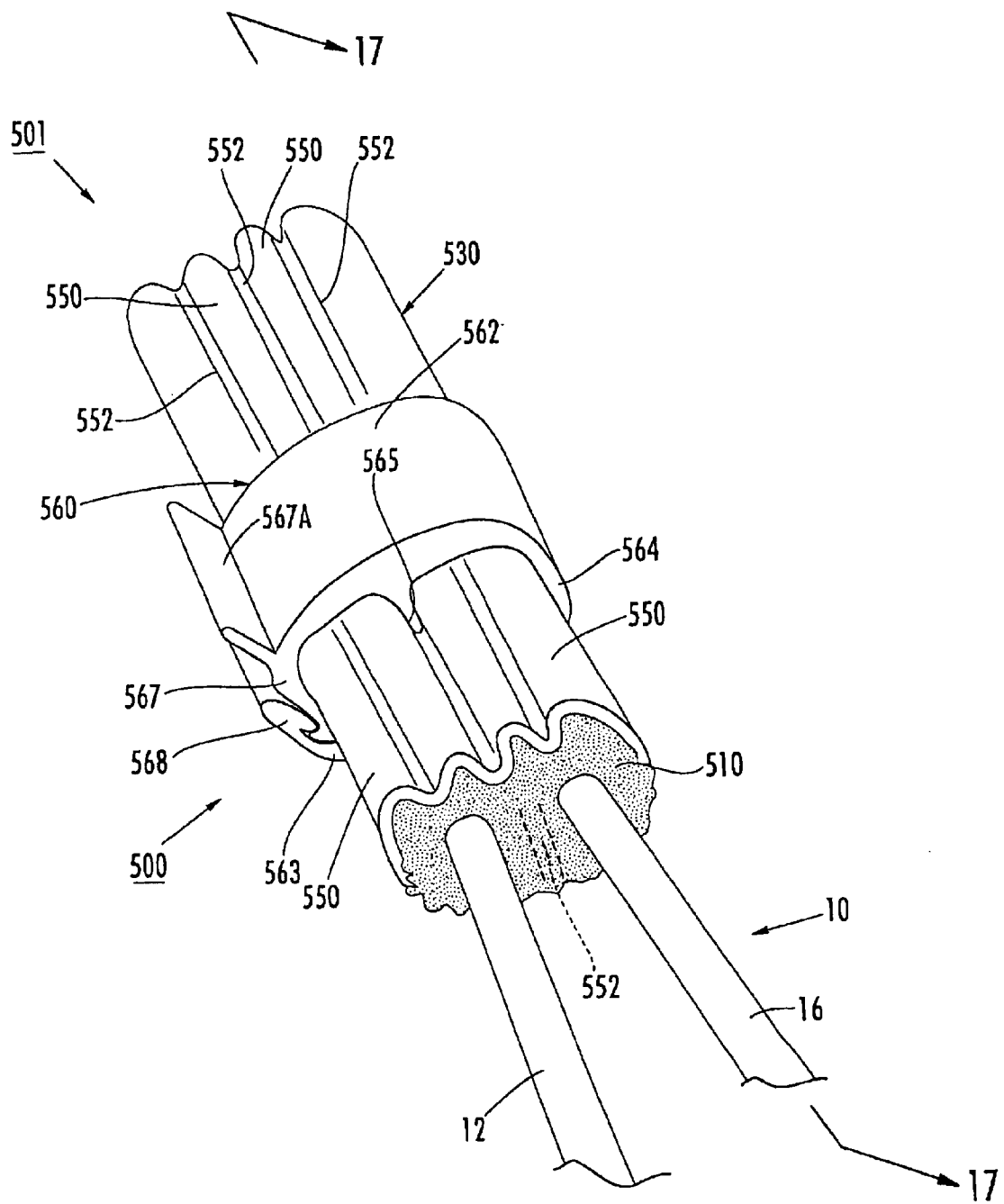
FIG. 12 is a perspective view of a protected electrical connection assembly according to further embodiments of the present invention.
Figure 13:
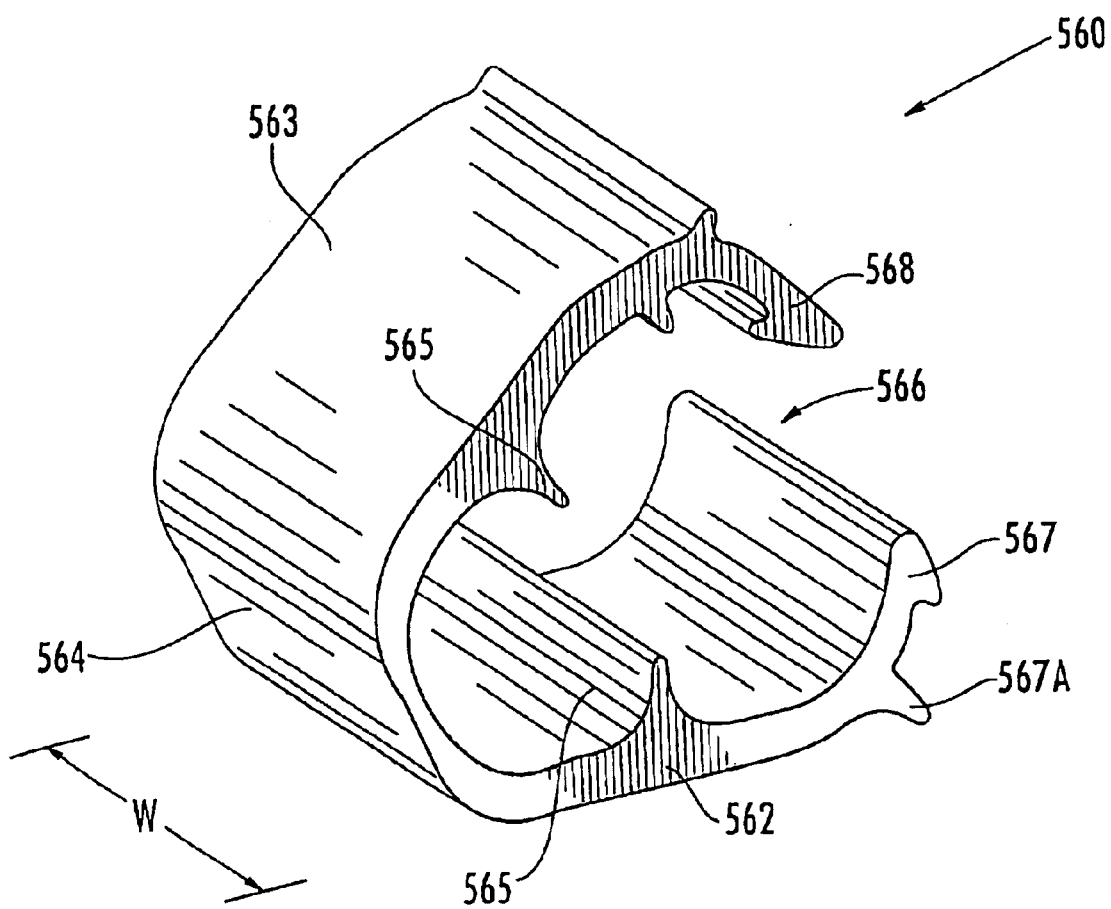
FIG. 13 is a perspective view of a clamp forming a part of the connection assembly of FIG. 12.
Figure 14:
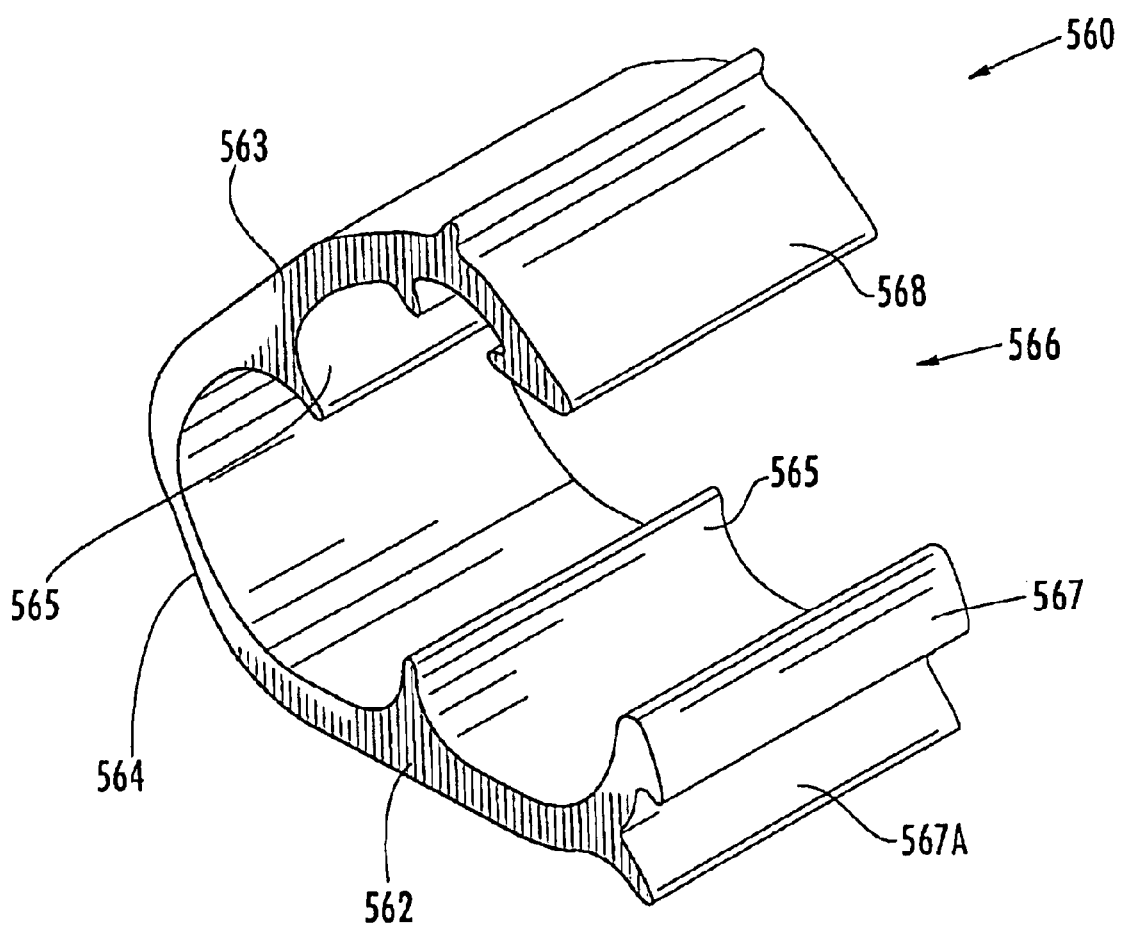
FIG. 14 is a further perspective view of the clamp of FIG. 13.
Figure 15:
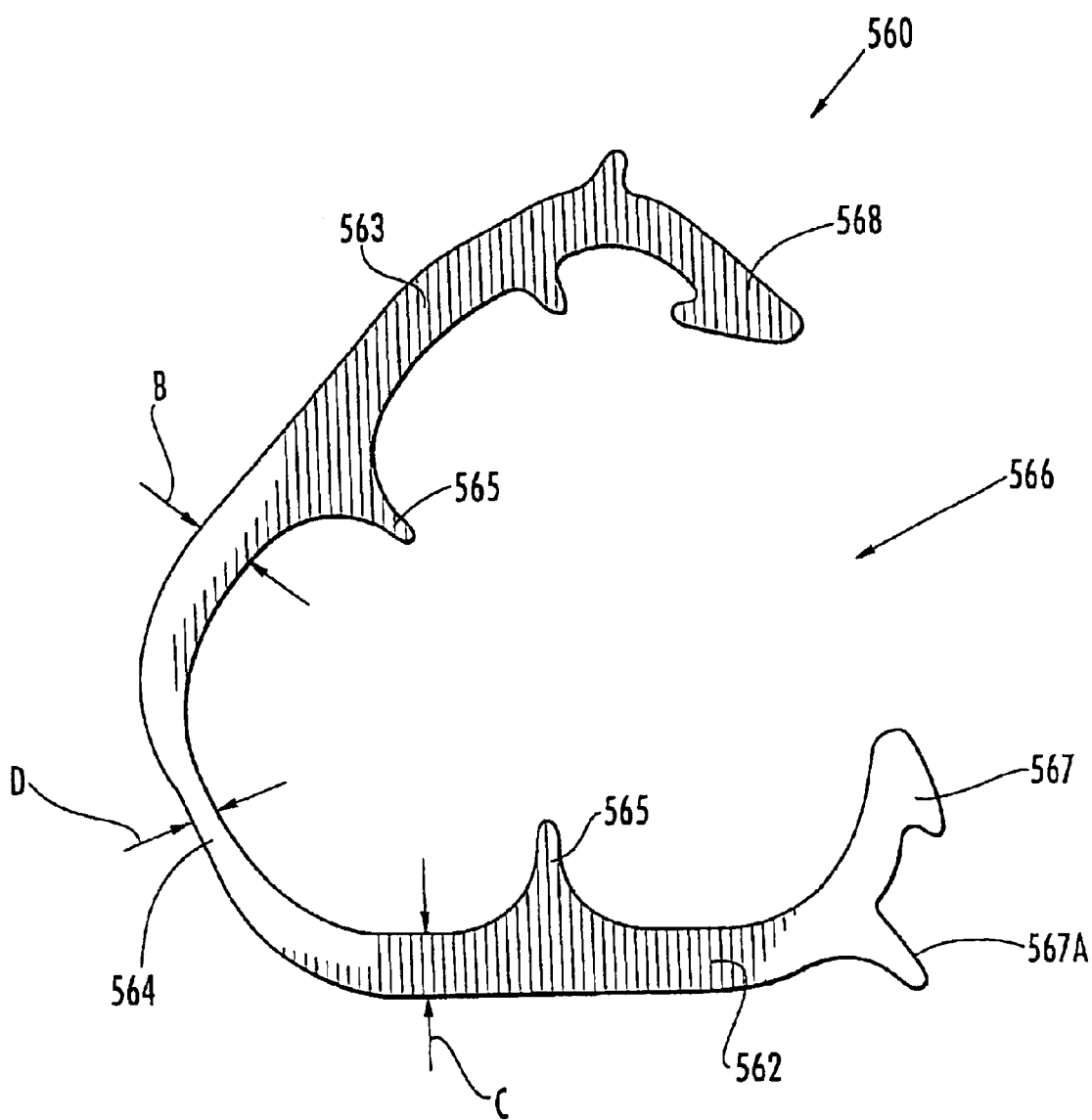
FIG. 15 is a side elevational view of the clamp of FIG. 13.
Figure 16:
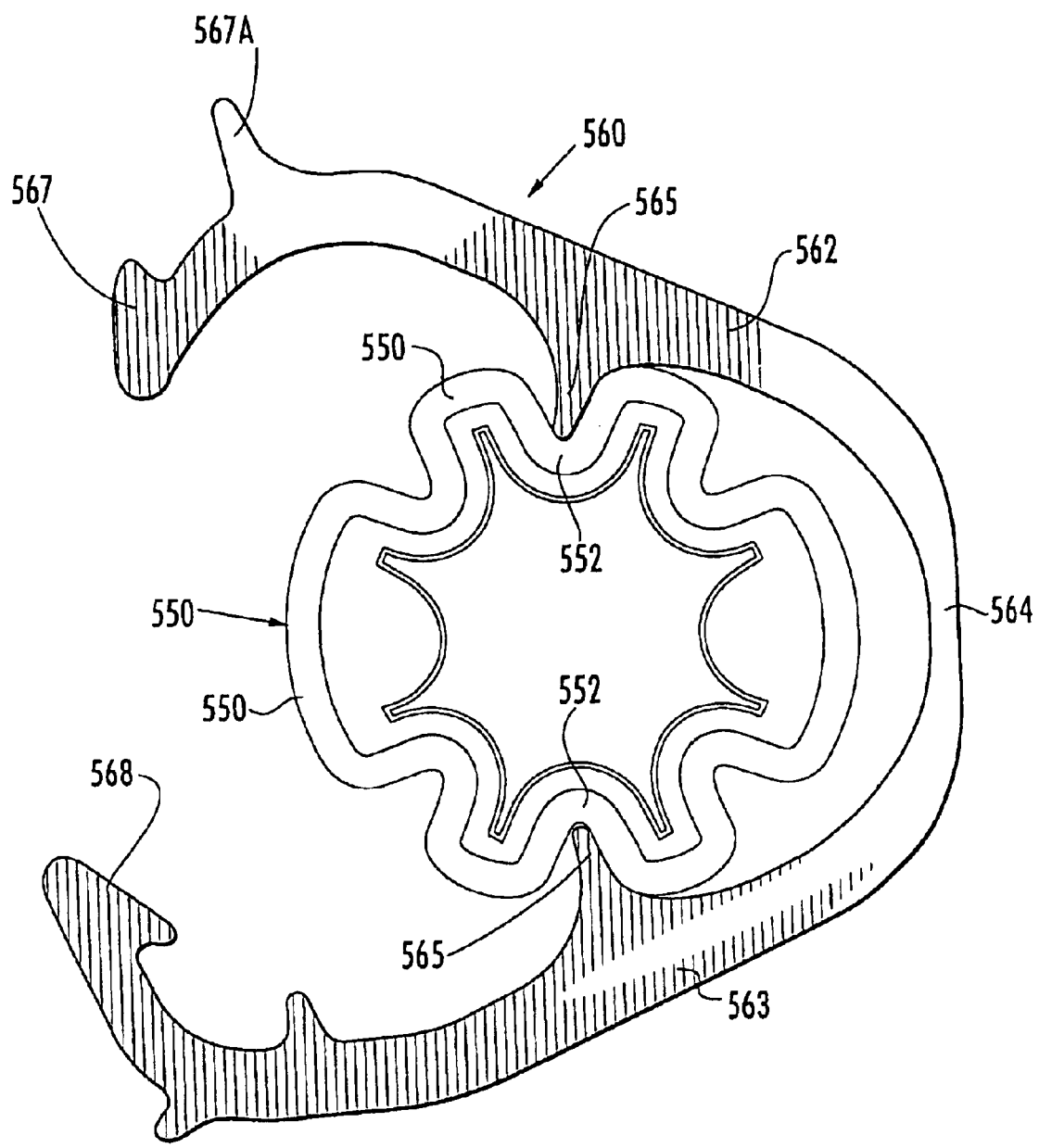
FIG. 16 is an end view of the clamp and a cap forming a part of the connection assembly of FIG. 12.
Figure 17:
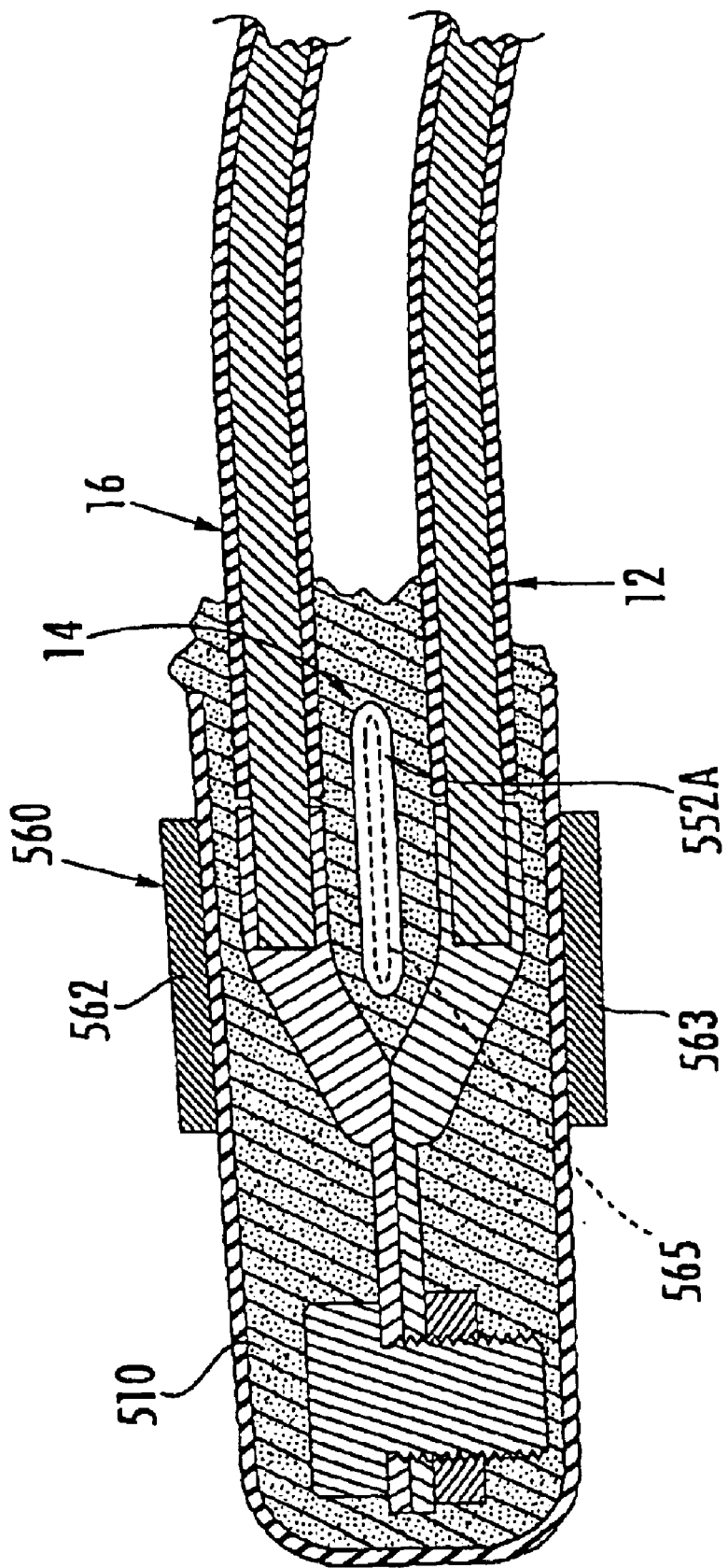
FIG. 17 is a cross-sectional view of the connection assembly of FIG. 12 taken along the line 17—17 of FIG. 12.

The kit 500 may be used in the following manner. The connection 10 and the gel 510 are installed in the cap 530 in the same manner as described above with regard to the gel 210 and the cap 230. The clamp 560 is opened and wrapped about the cap 530 as shown in FIG. 16 (wherein the gel and connection are omitted for clarity) such that the ribs 565 are located in opposed inwardly extending corrugations 552 and in or adjacent the crotch 14. The clamp 560 is then compressed to close the clamp 560 about the cap 530 and to interlock the latch structures 567,568 as shown in FIGS. 12 and 17. This action is facilitated by the rib 567A. The rib 567A also serves to protect the latch structures 567, 568 from unintentional disengagement.

As the clamp 560 is compressed into the closed position, the ribs 565 force the corrugations 552 inwardly into the crotch 14, thereby deforming the cap 530 and displacing a portion of the gel 510. The cap 530 may be deformed such that the opposed corrugations 552 fully displace the interposed gel 510 and make contact as shown in FIG. 17, or may be displaced by a lesser amount. However, upon closure of the clamp 560, portions of the opposed corrugations 552 are preferably disposed within the crotch 14 to prevent or resist withdrawal of the connection 10 from the cap 530. Additionally, the ribs 565, the walls 562, 563 and the connecting portion 564 apply a compressive force to the gel 510 as discussed above with regard to the kit 100.

Figure 18:
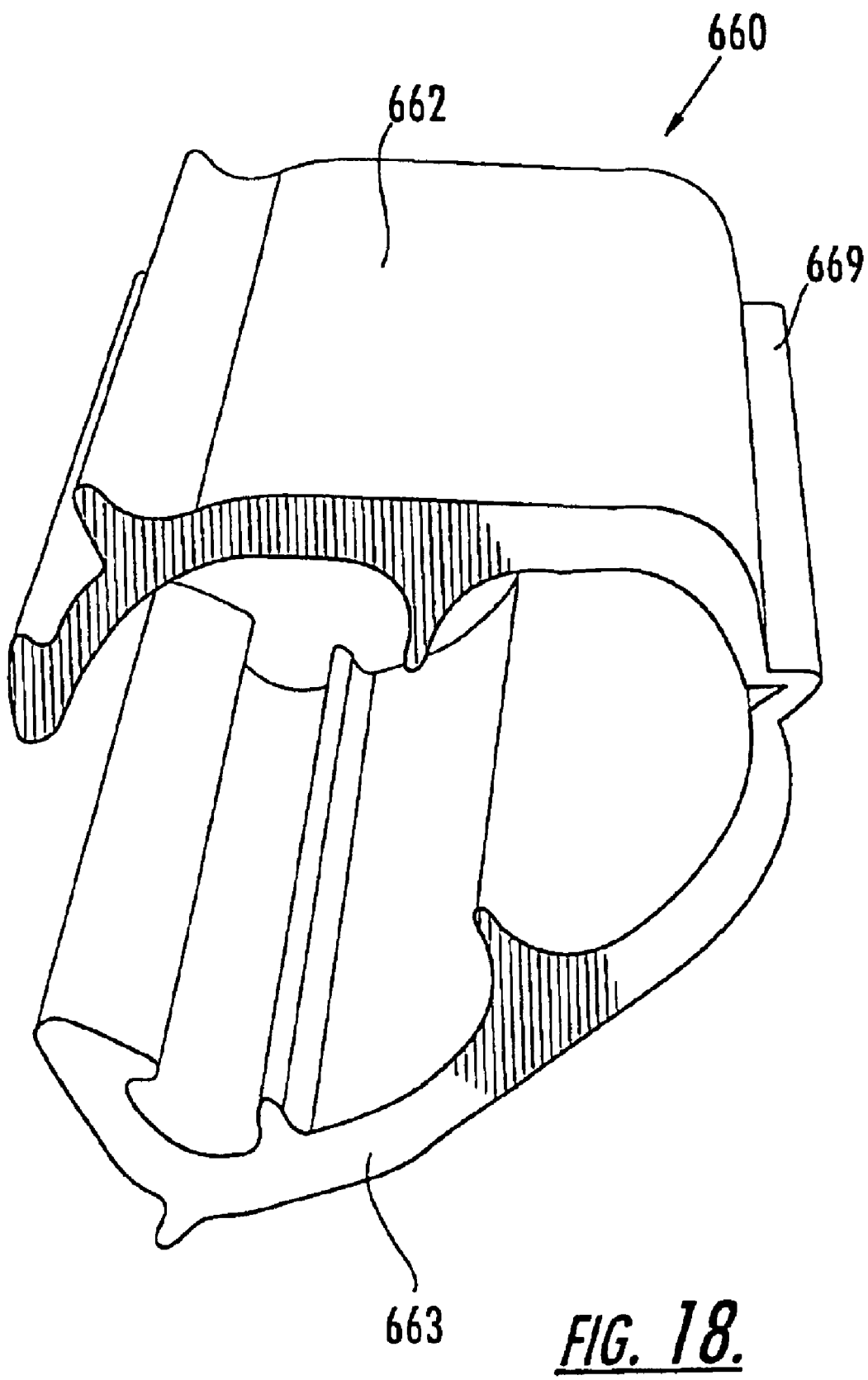
FIG. 18 is a perspective view of a clamp according to further embodiments of the present invention.
Figure 19:
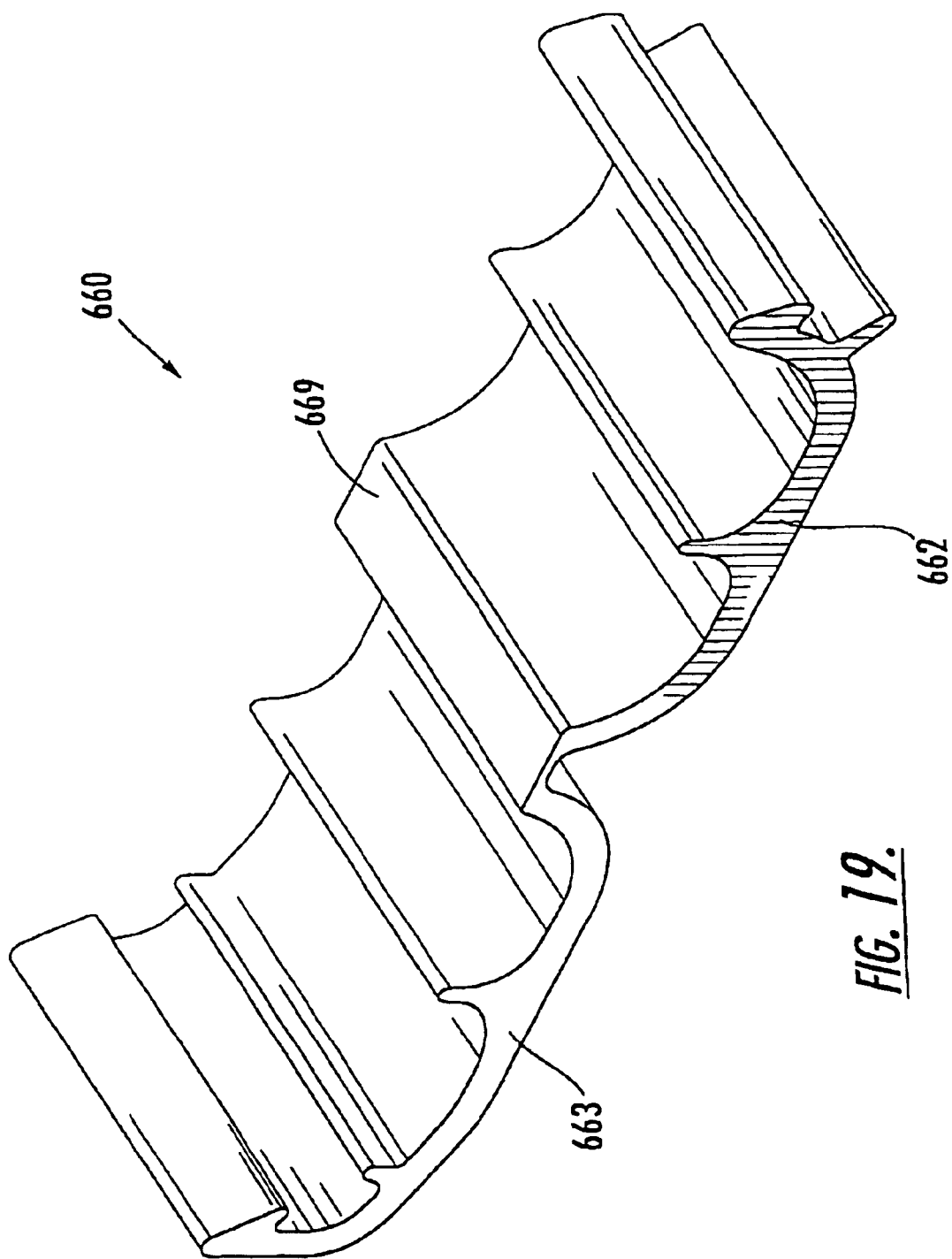
FIG. 19 is a perspective view of the clamp of FIG. 18 in a fully open position.
Figure 20:
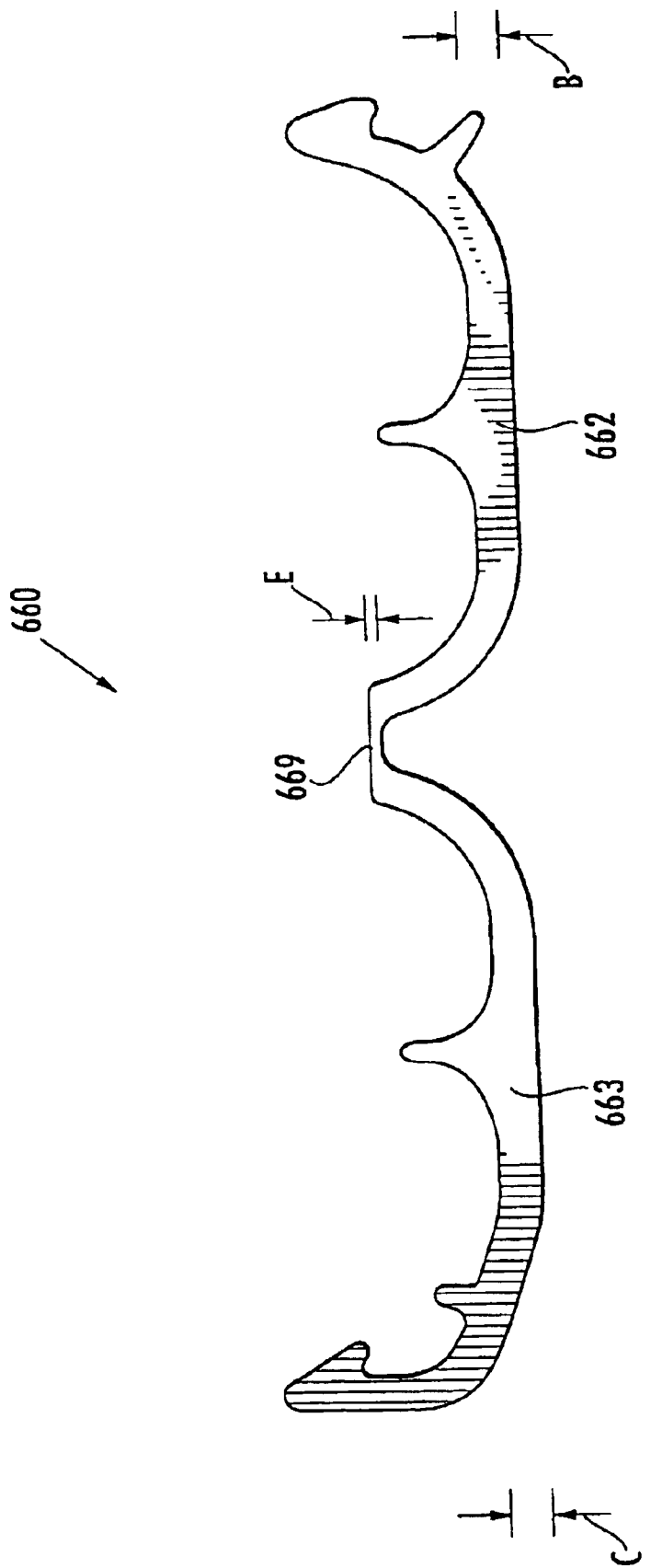
FIG. 20 is a side elevational view of the clamp of FIG. 18 in the fully open position.

With reference to FIGS. 18–20, a clamp 660 according to further embodiments of the present invention is shown therein. The clamp 660 may be used in kits and in the same manner as described above with regard to the clamp 560. The clamp 660 generally corresponds to the clamp 560 except that the clamp 660 includes a living hinge 669 joining the walls 662, 663 in place of the connecting portion 564. The living hinge 669 has a substantially reduced nominal thickness E as compared to the nominal thicknesses B and C of the walls 662, 663. Preferably, the living hinge 669 can be flexed through an angle of at least 180 degrees without breaking or significant plastic deformation.

With reference to FIGS. 21 and 22, an electrical connection protector kit 700 according to further embodiments of the present invention and a protected electrical connection assembly 701 including the kit 700 mounted on the connection 10 are shown therein. The kit 700 generally corresponds to the kit 500 except that the kit 700 is secured using a clamp 760 and a tie wrap 770 in place of the clamp 560.

The clamp 760 has passages 772, 773 extending through the walls 762 and 763 and communicating with opposed openings 772A and 773A. As shown, the free edges 767, 768 are plain, but, alternatively, may be provided with latching structures corresponding to the latching structures 567, 568, for example. The connecting portion 764 corresponds to the connecting portion 564, but, alternatively, may be replaced with a living hinge corresponding to the living hinge 669.

The clamp 760 is wrapped about the cap 730 in the same manner as described above with regard to the clamp 560 such that the locating ribs 765 are received in opposed inwardly extending corrugations 752 and in or adjacent the crotch 14 (not shown in FIG. 21). Before or after wrapping the clamp 760 about the cap 730, a flexible strip 774 of the tie wrap 770 is inserted through the openings and passages 772, 772A, 773, 773A as shown. The lead end 774A of the strip 774 is pulled through an opening 776A in a lock head 776 of the tie wrap 770. The tie wrap 770 is pulled tight to force the ribs 765 into the corrugations 752 and, in turn, the corrugations 752 into the crotch 14 as described above. The tie wrap 770 may be of conventional design, such devices being well known to those of skill in the art.

Figure 23:
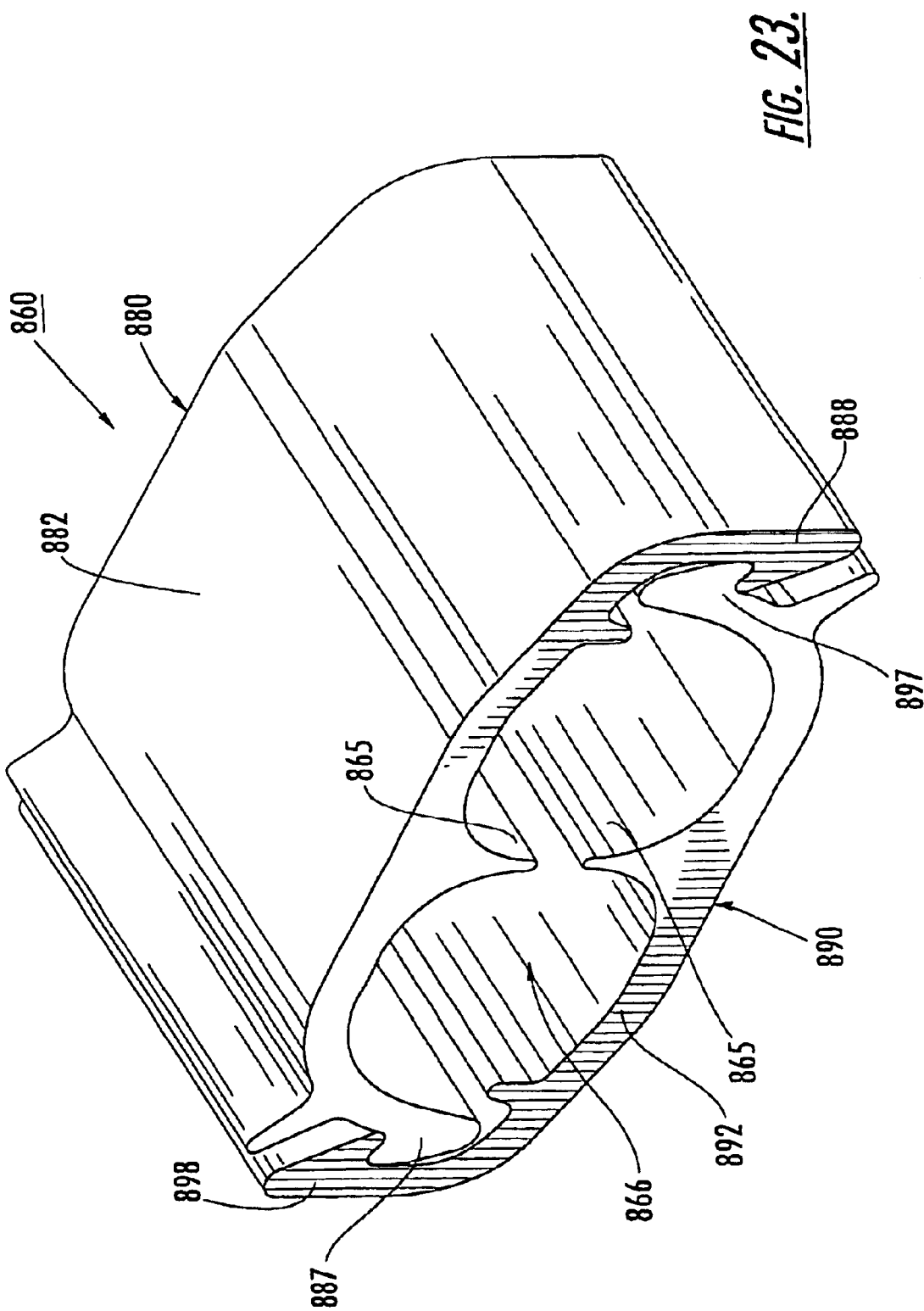
FIG. 23 is a perspective view of a clamp according to further embodiments of the present invention.
Figure 24:
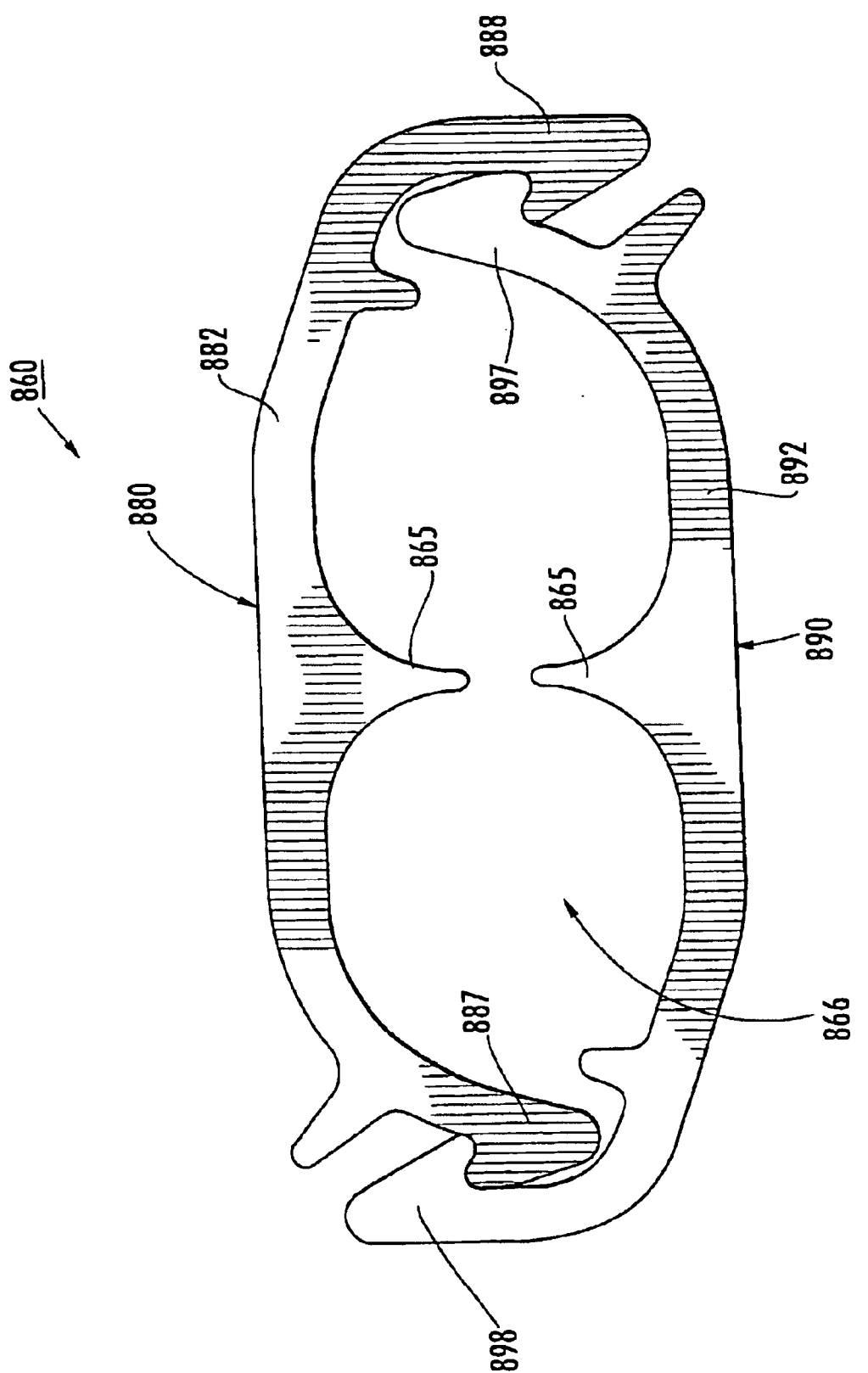
FIG. 24 is a side elevational view of the clamp of FIG. 23.

With reference to FIGS. 23 and 24, a clamp 860 according to further embodiments of the present invention is shown therein. The clamp 860 may be used in kits and in a similar manner to that described above with regard to the clamp 560. The clamp 860 includes a first member 880 and a second member 890. The first member 880 has a wall 882, a locating rib 865, and latching structures 888 and 887 on either end of the wall 882. Similarly, the second member 890 includes a wall 892, a locating rib 865, and latching structures 897 and 898 on either end thereof. The first and second members 880, 890 define a cavity 866 therebetween.

The clamp 860 may be used in the following manner. The connection 10 and gel corresponding to the gel 510 are installed in a cap corresponding to the cap 530 in the same manner as described above with regard to the kit 500. The first and second members 880 and 890 are placed on opposite sides of the cap such that the locating ribs 865 are positioned opposite one another and adjacent the crotch 14 of the connection 10. The first and second members 880, 890 are then forced together by hand or using a suitable tool until the latching structures 897 and 888 and the latching structures 887 and 898 are engaged as shown in FIGS. 23 and 24.

Notably, because the caps 530, 730, for example, employed with the clamps 560, 660, 760, 860 need not have holes to receive a pin, they may be formed without such holes. This may be beneficial during manufacture because the caps can be filled with the uncured gel material without providing means to prevent the uncured gel material from leaking through such holes.

Figure 25:
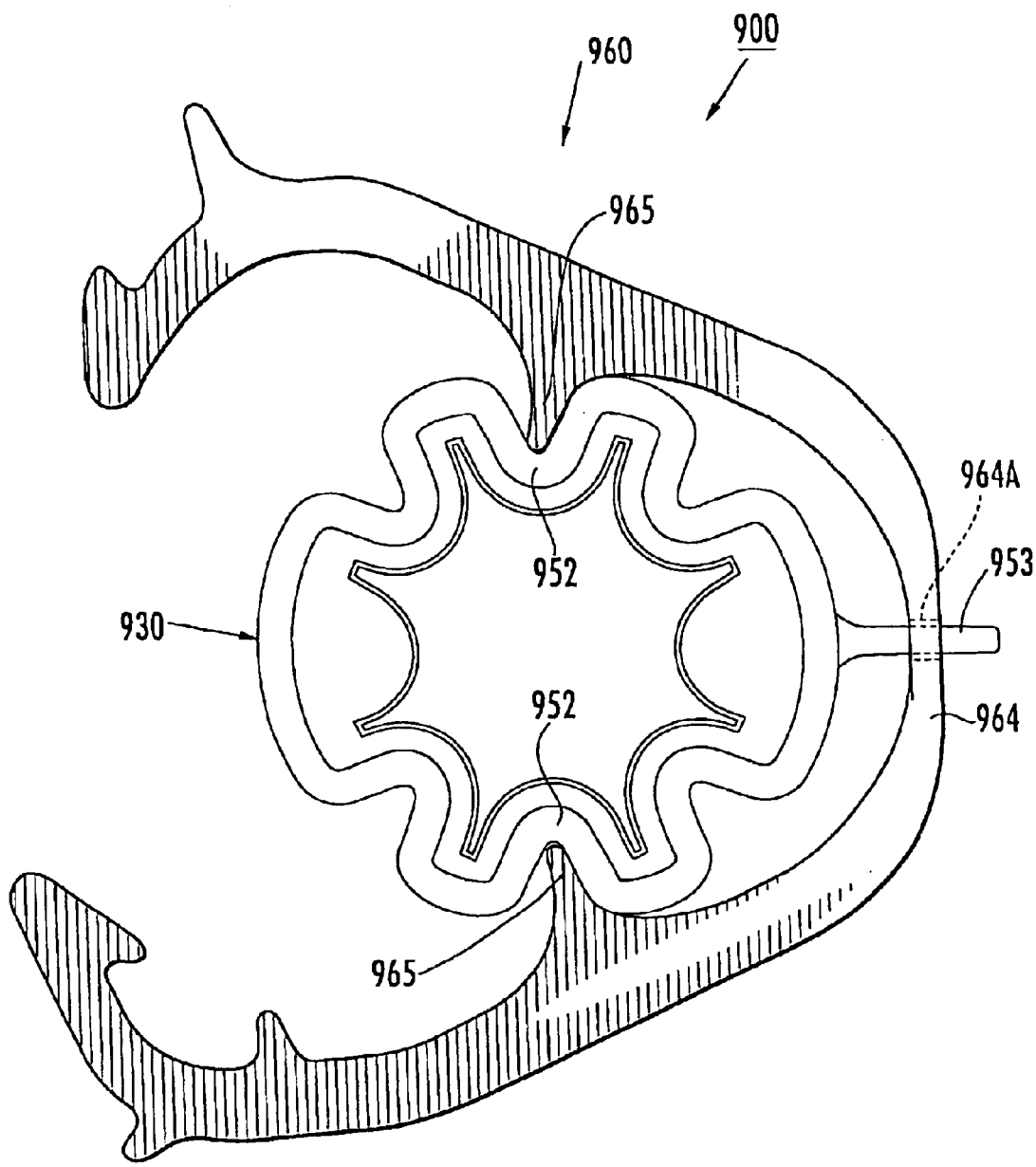
FIG. 25 is an end view of a clamp and a cap forming a part of a protected electrical connection assembly according to further embodiments of the present invention.
Figure 26:
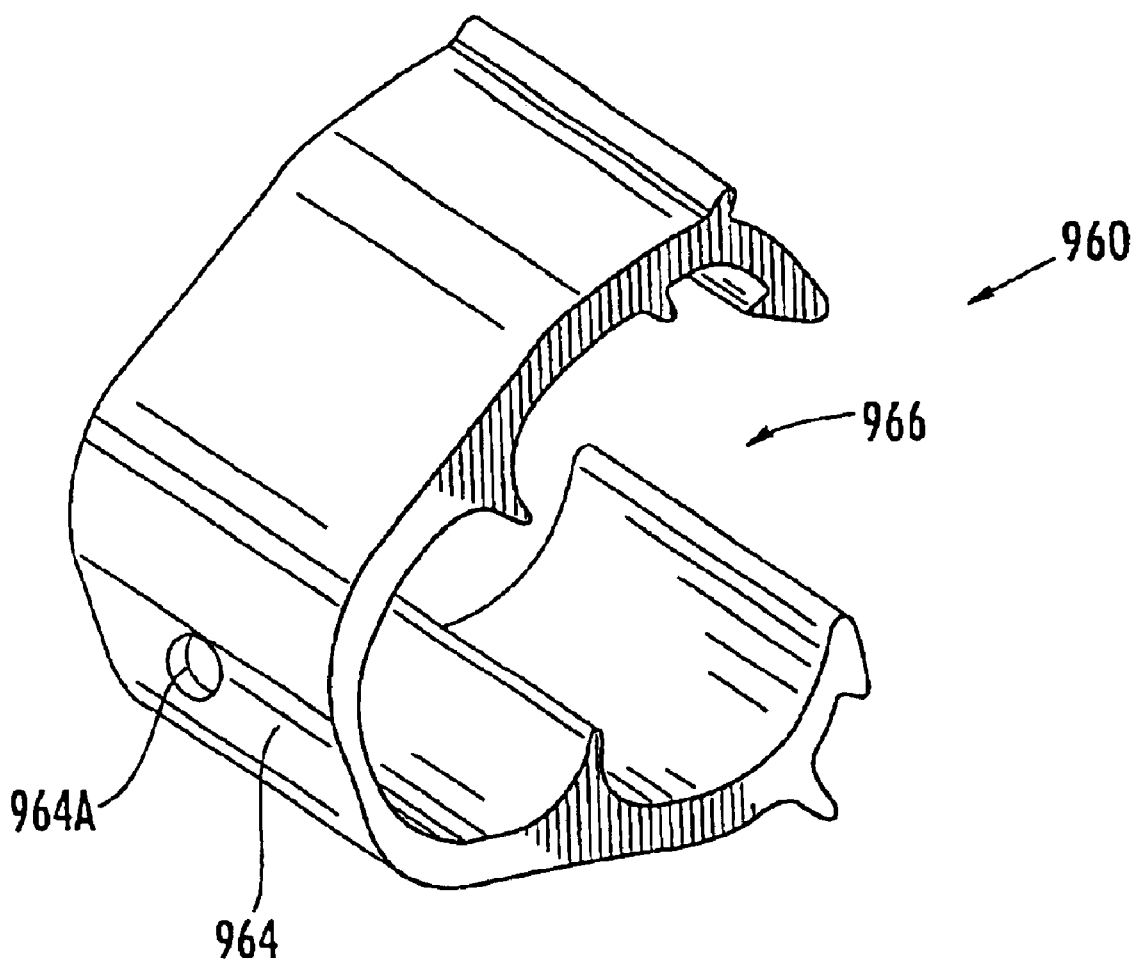
FIG. 26 is a perspective view of the clamp of FIG. 25.

With reference to FIG. 25, an electrical connection protector kit 900 according to further embodiments of the present invention is shown therein. The kit 900 may be used to form a protected electrical connection assembly corresponding to the assembly 501 and including the kit 900. For clarity, the gel and connection are omitted from FIG. 25. The clamp 960 of the kit 900 is also shown in FIG. 26.

The kit 900 generally corresponds to the kit 500 except that the clamp 960 includes a hole 964A in the connecting portion 964 and the cap 930 includes an outwardly extending positioning projection 953. The hole 964A communicates with the cavity 966 and preferably extends fully through the thickness of the connecting portion 964. The hole 964A is sized to receive the positioning projection 953 therethrough.

The clamp 960 may be mounted on the cap 930, the gel (not shown in FIG. 25) and the connection (not shown in FIG. 25) by placing the clamp 960 over the cap 930 such that the projection 953 is inserted through the hole 964A. In this manner, the clamp 960 is positively axially and radially located with respect to the cap 930. As a result, the locating ribs 965 are positively radially located such that they mate with the inwardly extending corrugations 952. Also, in this manner, the locating projections 965 are axially located with respect to the connection in the cap 930 such that the locating projections 965 are properly positioned adjacent the crotch 14 of the connection 10. Thereafter, the clamp 960 is secured in the manner described above with regard to the kit 500.

The foregoing kits 500, 700, 900 and kits including the clamps 660, 860 and other kits as described herein may also be used without the gels, (e.g., the gels 110, 120, etc.) to form protected electrical connection assemblies.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A protected electrical connection assembly comprising:
  a) a compressed, flexible cap having a closed first end and a second end opposite said first end, said cap including:
      an interior wall defining a cavity;
      an opening formed in said second end and communicating with said cavity; and
      first and second opposed, inwardly extending corrugations;
  b) a stub connection including a pair of elongated, electrically conductive elements joined at respective terminal ends thereof, said conductive elements defining a crotch therebetween and extending through said opening, said terminal ends and at least a portion of each of said conductive elements being disposed in said cavity of said cap;
  c) a gel disposed in said cavity and interposed between said stub connection and said interior wall of said cap, wherein said gel is elongated and elastically deformed and applies an outward force against said connection and said interior wall, at least a portion of said gel being elongated at least 50%; and
  d) a clamp retaining said cap on said connection and maintaining said cap in compression, said clamp including:
      first and second opposed walls; and
      first and second opposed locating projections extending inwardly from said first and second opposed walls, said first and second locating projections disposed in said first and second opposed inwardly extending corrugations, respectively, and adjacent said crotch;
  e) wherein substantially all exposed, electrically conductive portions of said connection are substantially completely immersed in said gel.

2. A connection protector kit for use with an electrical stub connection, said kit comprising:
  a) a flexible cap having first and second opposed ends and an interior wall defining a cavity, said first end being closed and an opening being formed in said second end and communicating with said cavity;
  b) a gel disposed in said cavity;
  c) means for retaining said cap on the connection, said means for retaining including a clamp; and
  d) wherein said cavity and said gel are adapted to receive the stub connection; and e) wherein said clamp includes at least one inwardly extending locating projection.

3. The kit of claim 2 wherein said means for retaining is operative to maintain said cap in a compressed position.

4. The kit of claim 2 wherein said clamp includes first and second opposed walls and a connecting portion joining said first and second walls, said connecting portion and said first and second walls defining a cavity to receive said cap, said gel and the connection.

5. The kit of claim 2 wherein said clamp includes first and second opposed walls and first and second latching structures on said first and second walls, respectively, said first and second latching structures adapted to secure said clamp in a closed position about said cap, said gel and the connection.

6. The kit of claim 2 including a flexible tie wrap to secure said clamp in a closed position about said cap, said gel and the connection.

7. The kit of claim 6 wherein said clamp includes first and second opposed walls and first and second passages defined in said first and second walls, respectively, said first and second passages adapted to receive said tie wrap.

8. The kit of claim 2 wherein said clamp includes separable first and second members and each of said first and second members has first and second latch structures on either end thereof, said first and second latch structures of said first member being interlockable with said first and second latch structures of said second member to secure said first and second members together and about said cap, said gel and the connection.

9. The kit of claim 2 wherein said cap includes a plurality of expandable corrugations.

10. The kit of claim 2 wherein said cap is formed of a material having a flexural modulus of between about 5,000 and 100,000 psi and a durometer of between about 40 Shore A and 90 Shore D.

11. The kit of claim 2 wherein said gel has a Voland hardness of between about 5 and 30 grams force, an elongation of at least 100%, a stress relaxation of no more than 50%, and a tack of greater than about 6 grams.

12. The kit of claim 2 wherein said cap includes an inwardly extending channel adapted to receive said inwardly extending locating projection.

13. The kit of claim 2 wherein said cavity and said gel are adapted to receive the stub connection such that said gel is elongated and elastically deformed.

14. A connection protector kit for use with an electrical stub connection, said kit comprising:
a) a flexible cap having first and second opposed ends and an interior wall defining a cavity, said first end being closed and an opening being formed in said second end and communicating with said cavity;
b) a gel disposed in said cavity;
c) means for retaining said cap on the connection, said means for retaining including a clamp; and
d) wherein said cavity and said gel are adapted to receive the stub connection; and
e) wherein said clamp includes first and second opposed, inwardly extending locating projections.

15. The kit of claim 14 wherein said cap includes first and second opposed, inwardly extending corrugations adapted to receive said first and second locating projections.

16. A connection protector kit for use with an electrical stub connection, said kit comprising:
a) a flexible cap having first and second opposed ends and an interior wall defining a cavity, said first end being closed and an opening being formed in said second end and communicating with said cavity;
b) a gel disposed in said cavity;
c) means for retaining said cap on the connection, said means for retaining including a clamp; and
d) wherein said cavity and said gel are adapted to receive the stub connection; and
e) wherein said clamp includes first and second opposed walls and a living hinge joining said first and second walls, said living hinge and said first and second walls defining a cavity to receive said cap.

17. The kit of claim 16 wherein said clamp includes at least one inwardly extending locating projection.

18. The kit of claim 17 wherein said cap includes an inwardly extending channel adapted to receive said inwardly extending locating projection.

19. The kit of claim 16 wherein said clamp includes first and second opposed, inwardly extending locating projections.

20. The kit of claim 19 wherein said cap includes first and second opposed, inwardly extending corrugations adapted to receive said first and second locating projections.

21. The kit of claim 16 wherein said cap includes an outwardly extending positioning projection and said clamp has a locating hole defined therein and adapted to receive said positioning projection.

22. A connection protector kit for use with an electrical stub connection, said kit comprising:
a) a flexible cap having first and second opposed ends and an interior wall defining a cavity, said first end being closed and an opening being formed in said second end and communicating with said cavity;
b) a gel disposed in said cavity;
c) means for retaining said cap on the connection, said means for retaining including a clamp; and
d) wherein said cavity and said gel are adapted to receive the stub connection; and
e) wherein said cap includes an outwardly extending positioning projection and said clamp has a locating hole defined therein and adapted to receive said positioning projection.

23. A protected electrical connection assembly comprising:
a) a flexible cap defining an opening and having an interior wall defining a cavity, said cavity communicating with said opening;
b) a stub connection including a pair of elongated, electrically conductive elements joined at respective terminal ends thereof, said conductive elements defining a crotch therebetween and extending through said opening, said terminal ends and at least a portion of each of said conductive elements being disposed in said cavity of said cap;
c) a gel disposed in said cavity and interposed between said stub connection and said interior wall of said cap; and
d) means for retaining said cap on said connection;
e) wherein said means for retaining includes a clamp, said clamp including at least one inwardly extending locating projection.

24. The kit of claim 23 wherein said clamp includes first and second opposed walls and a living hinge joining said first and second walls, said living hinge and said first and second walls defining a cavity to receive said cap.

25. A connection protector kit for use with an electrical stub connection, said kit comprising:

a) a flexible cap having first and second opposed ends and an interior wall defining a cavity, said first end being closed and an opening being formed in said second end and communicating with said cavity; and b) a clamp to retain said cap on the connection;

c) wherein said cavity is adapted to receive the stub connection; and d) wherein said clamp includes at least one inwardly extending locating projection.

26. The kit of claim 25 wherein said cap includes an inwardly extending channel adapted to receive said inwardly extending locating projection.

27. A protected electrical connection assembly comprising:

a) a flexible cap defining an opening and having an interior wall defining a cavity, said cavity communicating with said opening;

b) a stub connection including a pair of elongated, electrically conductive elements joined at respective terminal ends thereof, said conductive elements defining a crotch therebetween and extending through said opening, said terminal ends and at least a portion of each of said conductive elements being disposed in said cavity of said cap; and c) a clamp retaining said cap on said connection;

d) wherein said clamp includes at least one inwardly extending locating projection and said cap includes an inwardly extending channel receiving said inwardly extending projection.

28. The assembly of claim 27 wherein at least a portion of said gel is elongated at least 50%.

29. The assembly of claim 27 wherein said cap is compressed.

30. The assembly of claim 29 wherein said cap is maintained in compression by said clamp.

31. A method for protecting an electrical stub connection, said method comprising the steps of:

providing a cap having a cavity and a gel disposed in the cavity;

inserting the stub connection into the cavity and the gel such that the stub connection displaces and thereby deforms and elongates the gel;

compressing the cap to further displace and thereby deform and elongate the gel; and securing a clamp about the cap to retain the cap on the stub connection and to maintain the gel in the elongated state such that the gel exerts an outward force on each of the stub connection and the interior wall of the cap;

wherein said step of securing a clamp includes inserting a locating projection of the clamp into a crotch of the stub connection.

32. The method of claim 31 including the step of expanding the cap to accommodate the stub connection.

33. The method of claim 32 wherein said step of expanding includes the step of expanding corrugations in the cap.

34. The method of claim 31 including elastically deforming and elongating the gel about the stub connection.

35. The method of claim 34 including deforming and elongating the gel about the stub connection by at least 50%.

* * * * *